(12) United States Patent
Omura

(10) Patent No.: US 9,342,290 B2
(45) Date of Patent: May 17, 2016

(54) INFORMATION PROCESSING APPARATUS, INSTALLATION METHOD, AND PROGRAM

(71) Applicant: CANON KABUSHIKI KAISHA, Tokyo (JP)

(72) Inventor: Hiroshi Omura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/419,794

(22) PCT Filed: Jul. 26, 2013

(86) PCT No.: PCT/JP2013/004554
§ 371 (c)(1),
(2) Date: Feb. 5, 2015

(87) PCT Pub. No.: WO2014/024410
PCT Pub. Date: Feb. 13, 2014

(65) Prior Publication Data
US 2015/0242195 A1 Aug. 27, 2015

(30) Foreign Application Priority Data
Aug. 8, 2012 (JP) .................. 2012-176024

(51) Int. Cl.
G06F 9/445 (2006.01)
G06F 3/12 (2006.01)
G06F 9/44 (2006.01)
G06F 13/10 (2006.01)
(52) U.S. Cl.
CPC ................ *G06F 8/61* (2013.01); *G06F 3/1204* (2013.01); *G06F 3/1225* (2013.01); *G06F 3/1284* (2013.01); *G06F 9/4411* (2013.01); *G06F 9/44505* (2013.01); *G06F 13/105* (2013.01)

(58) Field of Classification Search
CPC ...................................................... G06F 9/4411
USPC ......................................................... 719/327
See application file for complete search history.

(56) References Cited

U.S. PATENT DOCUMENTS

| 7,506,142 | B2 * | 3/2009 | Yoshimura et al. ............... 713/1 |
| 2002/0083431 | A1 * | 6/2002 | Machida ......................... 717/174 |
| 2006/0150246 | A1 * | 7/2006 | Kamada et al. .................. 726/17 |
| 2008/0117452 | A1 * | 5/2008 | Murakami .................... 358/1.15 |
| 2009/0070740 | A1 * | 3/2009 | Onodera ............. G06F 12/0276 717/116 |

FOREIGN PATENT DOCUMENTS

| JP | 2005-326964 A | 11/2005 |
| JP | 2006-309724 A | 11/2006 |
| JP | 2009-217331 A | 9/2009 |

OTHER PUBLICATIONS

Jorrit N. Herder, Dealing with Driver Failures in the Storage Stack, 2009.*

* cited by examiner

*Primary Examiner* — Lechi Truong
(74) *Attorney, Agent, or Firm* — Canon USA, Inc. IP Division

(57) ABSTRACT

An information processing apparatus is configured to install a driver that has not yet been customized, in response to the start of installation of the driver, and modifies the installed driver such that a function setting value settable through the installed driver becomes identical to a function setting value of a customized driver.

13 Claims, 23 Drawing Sheets

```
702 — ;WinXP SYSTEM PRINTER DRIVER INF FILE
711 — [Version]
7111 — Signature="$Windows NT$"
       Provider=%CANON%
       ClassGUID={4D36E979-E325-11CE-BFC1-08002BE10318}
       Class=Printer
7112 — DriverVer=0X/XX/2012,XXXXXX
7113 — CatalogFile=XXXX.cat

[Canon]
712 — "CanonABCLIPS"=ABC, ....
       ...
713 — [ABC]
7131 — ...
       DataFile=ABC.UPD
       ...
714 — [Strings]
       CANON="Canon"
7141 — DISK1="LIPS Printer Driver For WinXP/Vista/7"
       ...
```

INFORMATION PROCESSING APPARATUS, INSTALLATION METHOD, AND PROGRAM

TECHNICAL FIELD

The present invention relates to an information processing apparatus on which a customized driver is installed, a method for installing the driver, and a program.

BACKGROUND ART

Windows (registered trademark) printer driver is a representative example of print control programs for controlling a printer. An installation set for the Windows (registered trademark) printer driver includes a catalog file called a CAT file for the printer driver. The catalog file stores an array of hash values of files included in the installation set. An electronic signature can further be appended to the catalog file. If the stored hash values are compared with the hash values of the files in the installation set after verifying the electronic signature appended to the catalog file, it is possible to verify whether contents of the files within the installation set are modified.

Meanwhile, some users want to customize printer drivers in accordance with an environment into which a print system is introduced. In particular, with recent diversification of environments into which print systems are introduced, usage of printer drivers has also been diversified, and there is a growing demand for customization of printer drivers. To respond to such a demand, Japanese Patent Application Laid-Open No. 2006-309724 discusses a customization technique that allows initial setting values displayed by a printer driver by default to be modified and that enables input control of setting values which the user can set through a user interface (UI) of the printer driver.

When a printer driver is customized using a method discussed in Japanese Patent Application Laid-Open No. 2006-309724, a printer driver is created in which some setting files in an installation set for the printer driver have been modified. The created printer driver includes, in addition to the setting files that have been modified through the customization, unmodified driver module and catalog file.

Thus, it is of significance that a driver is created in such a form that allows a customized driver to be installed by itself. If the aforementioned created driver includes only the setting files that have been modified through the customization, a user needs to prepare a separate driver module. Therefore, the user needs to manage the modified setting files and a driver module in association with each other, which increases load on the user. Accordingly, in a conventional technique, a driver is created in a form such that a customized driver can be installed by itself. Since the user can carry out an installation operation with ease, such a customized driver may be considered a user-friendly driver. However, the setting files of that driver have been modified, and thus the driver is in a state where the hash values of the setting files do not match with the hash values written in the catalog file, or in other words, a state that lacks consistency between the catalog file and the installation set.

CITATION LIST

Patent Literature

PTL 1: Japanese Patent Application Laid-Open No. 2006-309724

SUMMARY OF INVENTION

An information processing apparatus according to one aspect of the present invention includes a starting unit configured to start installation of a driver customized as to a function setting value that can be set in a function setting screen and an installation unit configured to install a driver on which the customization has not yet been performed, in response to the start of installation of the driver, and to modify the installed driver such that a function setting value settable by the installed driver becomes identical to the function setting value of the driver on which the customization has been performed.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

As security concern increases, a new operating system (OS) is emerging that stops installation when the OS detects installation of a driver that lacks consistency between a catalog file and an installation set. Although a customized driver has advantages as described above, an information processing apparatus that includes such an OS does not allow installation of a customized driver. That is because a customized driver lacks consistency between a catalog file and an installation set. A user cannot use a customized driver in an information processing apparatus that includes such an OS.

The present invention is directed to installing a customized driver onto an information processing apparatus that includes an OS which does not allow installation of a customized driver that lacks consistency between a catalog file and an installation set.

Prior to describing exemplary embodiments of the present invention, a custom tool program to be used in the exemplary embodiments will be described. It should be noted that each of the exemplary embodiments exemplifies a method for customizing a printer driver for Windows (registered trademark), which is an OS program for personal computers and is distributed by Microsoft (registered trademark) Corporation.

Figure 1:
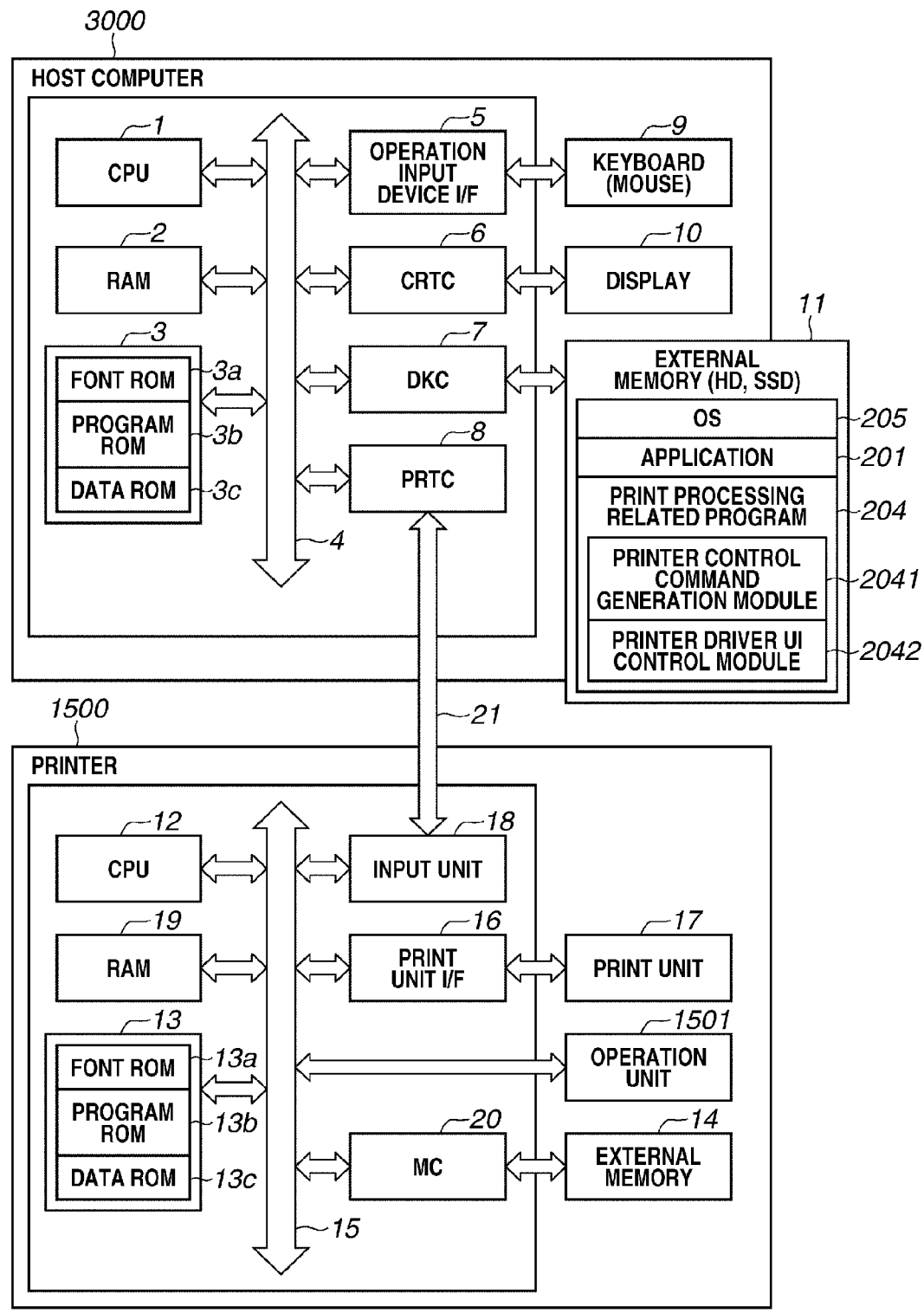
FIG. 1 is a block diagram illustrating a configuration of a print processing system according to an exemplary embodiment of the present invention.

FIG. 1 is a block diagram illustrating a configuration of a print processing system according to an exemplary embodiment of the present invention. This print processing system includes a host computer 3000, which is an information processing apparatus, and a printer 1500 that receives print data from the host computer 3000 to carry out printing.

In the host computer 3000, a central processing unit (CPU) 1 generally controls devices connected to a system bus 4 in accordance with a program stored in a RAM 2. The RAM 2 also functions as a main memory and a work area for the CPU 1. A read-only memory (ROM) 3 stores various programs and data pieces and includes a font ROM 3a, a program ROM 3b, and a data ROM 3c. The font ROM 3a stores various fonts, the program ROM 3b stores a boot program and a basic input/output system (BIOS), and the data ROM 3c stores various data pieces.

An operation input device interface (IF) 5 controls an input from a keyboard 9 or a pointing device such as a mouse. A cathode-ray tube (CRT) controller (CRTC) 6 controls a display on a display 10. A disk controller (DKC) 7 controls an access to an external memory 11 such as a hard disk (HD). A printer controller (PRTC) 8 is connected with the printer 1500 through a bidirectional interface 21 and carries out communication control processing between the PRTC 8 and the printer 1500.

The external memory 11 includes, for example, an HD and a flash memory drive (SSD). As illustrated in FIG. 1, the external memory 11 stores an OS 205, applications 201, and a print processing related program 204. Examples of the applications 201 include a document processing application program for processing a document in which graphics, images, texts, tables, and so on are mixedly present. The external memory 11 also stores a user file and an edit file (not illustrated) related to the applications 201. The print processing related program 204 generates print data that is written in a page description language and is shared by a plurality of printers of the same series. The print processing related program 204 (hereinafter, referred to as a printer driver) includes a printer control command generation module 2041 and a printer driver UI control module 2042.

The applications 201 that are stored in the external memory 11 and include a custom tool program (hereinafter, referred to as a custom tool) 300 of the exemplary embodiment, are loaded onto the RAM 2 and executed by the CPU 1. The CPU 1, for example, carries out rasterization processing of an outline font into the RAM 2 to enable a What You See Is What You Get (WYSIWYG) display on the display 10. Furthermore, the CPU 1 opens registered windows and carries out data processing based on commands instructed through a mouse on the display 10. When carrying out printing, a user can open a print setting screen, which is controlled by the printer driver UI control module 2042, and configure the settings for print processing in the printer driver such as function settings of the printer and selection of a print mode.

The configuration of the printer 1500 will now be described. A CPU 12 controls an overall operation of the printer 1500. A RAM 19 functions as a main memory and a work area for the CPU 12 and is also used as an output information expansion region and an environmental data storage region. In addition, the RAM 19 includes a non-volatile RAM (NVRAM) region and is configured such that the memory capacity thereof can be expanded with an optional RAM to be connected to an expansion port (not illustrated). A ROM 13 includes a font ROM 13a, a program ROM 13b, and a data ROM 13c. The font ROM 13a stores various fonts, the program ROM 13b stores a control program to be executed by the CPU 12, and the data ROM 13c stores various data pieces. An input unit 18 transmits and receives data to and from the host computer 3000. A print unit interface 16 controls an interface with a print unit 17, which is a printer engine. An access to an external memory 14 is controlled by a memory controller (MC) 20. The external memory 14 may be an external hard disk (HD), a magneto-optical disk (MO), a floppy (registered trademark) disk (FD), an integrated circuit (IC) card, or the like which are to be connected to the printer. The external memory 14 stores font data, an emulation program, form data, and so on. If the external memory 14 such as a hard disk is not connected, information to be used in the host computer 3000 is stored into the data ROM 13c of the ROM 13. The number of the external memory 14 is not limited to one, and the external memory 14 may be provided in a plurality. For example, external memories 14 that store optional font cards aside from the built-in fonts, and programs that interpret printer control languages of different language systems may be connected.

An operation unit 1501 includes an operation panel for accepting a user operation, and switches and light-emitting diode (LED) display devices (not illustrated) to be operated are arranged on the operation panel. In addition, the operation unit 1501 may include an NVRAM (not illustrated) and store printer mode setting information input from the operation panel. The CPU 12 outputs an image signal serving as output information to the print unit (printer engine) 17 through the print unit interface 16 in accordance with a control program stored in the program ROM 13*b* of the ROM 13. In addition, the CPU 12 can perform communication processing with the host computer 3000 through the input unit 18. The CPU 12 can receive print data transmitted from the host computer 3000 through the input unit 18 and also notify the host computer 3000 of information within the printer 1500.

Figure 2:
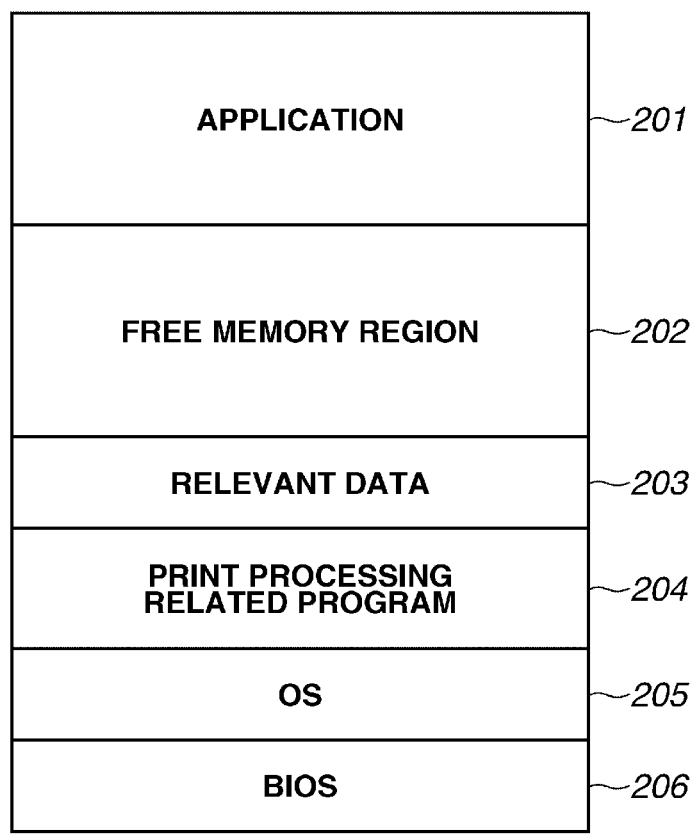
FIG. 2 illustrates a memory map in a random-access memory (RAM) of a host computer.

FIG. 2 illustrates a memory map in the RAM 2 in a state in which a predetermined application and a program related to print processing are started and a program and data are loaded onto the RAM 2 of the host computer 3000. As illustrated in FIG. 2, in addition to a BIOS 206 and an OS 205, the applications 201, the print processing related program 204, and relevant data 203 are loaded onto the RAM 2. A free memory region 202 is also secured in the RAM 2. With these settings, the applications 201 and the program 204 related to print processing can be executed. The printer driver UI control module 2042 (see FIG. 1) of the print processing related program 204 displays a print setting screen on the display 10 in response to a print setting instruction by a user and allows the user to configure the settings using the keyboard 9.

Figure 3:
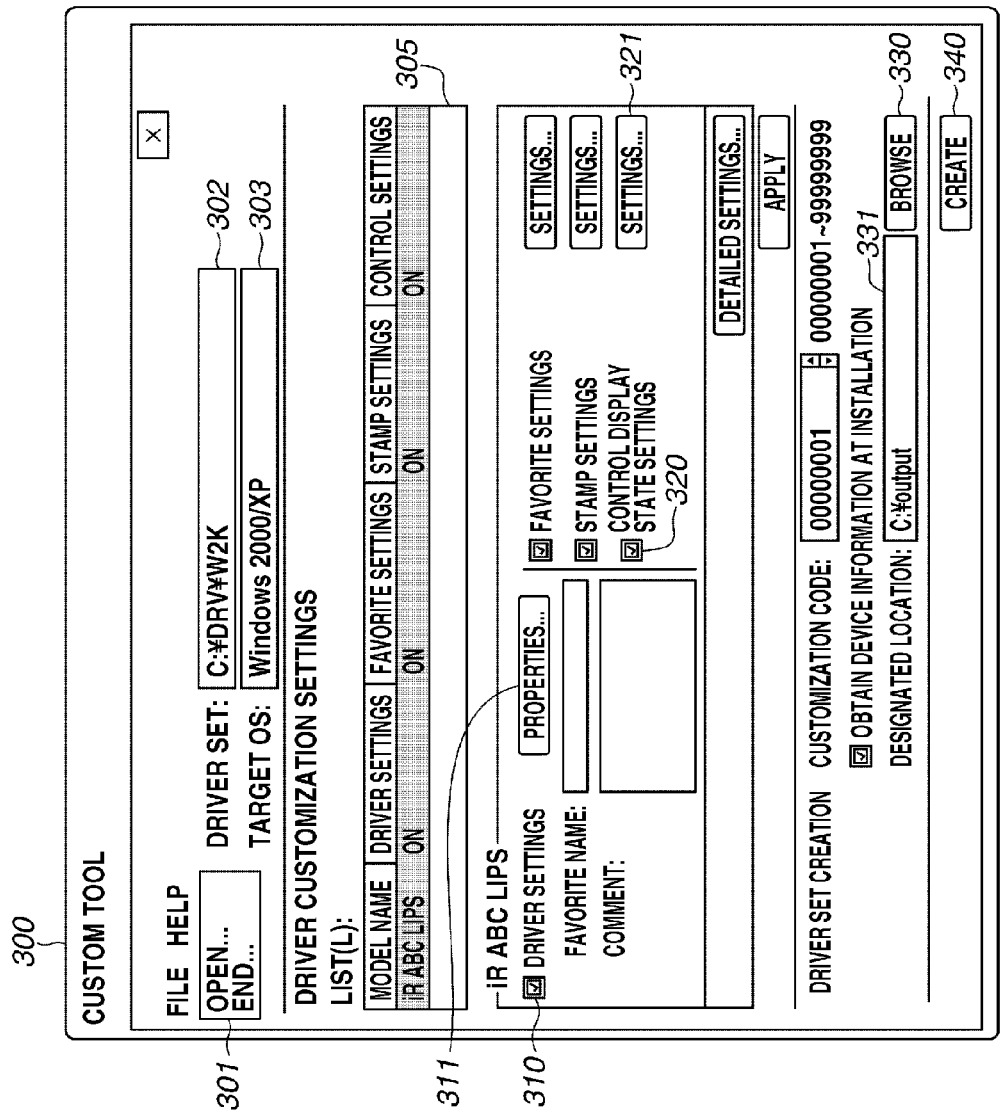
FIG. 3 illustrates an example of a main UI of a custom tool.

FIG. 3 illustrates an exemplary UI of the custom tool 300. The custom tool 300 is loaded as a part of the applications 201 illustrated in FIG. 2 and is realized when executed by the CPU 1 of the host computer 3000. In FIG. 3, when "open" is selected in a menu 301, a standard dialog box (not illustrated) for the OS 205 is displayed to specify an INF file of an installation set for a printer driver to be customized Then, an INF file for the printer driver to be customized is specified in the stated dialog box. Once the INF file is specified, a storage path to the INF file of the base installation set is displayed in a display field 302. In addition, a corresponding OS for the installation set for the printer driver in the storage destination of the specified INF file is displayed in a display field 303. Furthermore, a list of models that are compatible with the installation set for the printer driver to be customized is displayed in a list view 305. A target model to be customized can be selected in the list view 305. When a model to be customized is selected in the list view 305, a display of the current target model to be customized is changed in a section underneath the list view 305.

When a customization instruction from the user is received, identification information "on/off" indicating how a given model is customized, changes for each model in the list view 305. When the user checks a checkbox 310, a button 311 is enabled. When the user presses the button 311, a printer driver UI for customization (see FIG. 4) is displayed. In the printer driver UI, an initial value for print settings (document properties) and an initial value for device settings (printer properties) to be displayed by default can be set. When the user checks a checkbox 320, a button 321 is enabled. When the user presses the button 321, a UI (see FIG. 5) for customizing a display method of each control in the printer driver UI is displayed, and the display method of each print setting value in the printer driver UI for customization can be set. When the user presses a button 330, a standard dialog box of the OS 205 (not illustrated) is displayed for specifying a folder in which a customized driver is created. Then, a designated location in which the customized driver is created can be specified in the stated dialog box. Once the designated location is specified, a storage path to the customized installation set is displayed in a display field 331. When the user presses a button 340 after modifying various function setting values, a printer driver that is customized in accordance with the modified function settings is created.

Figure 4:
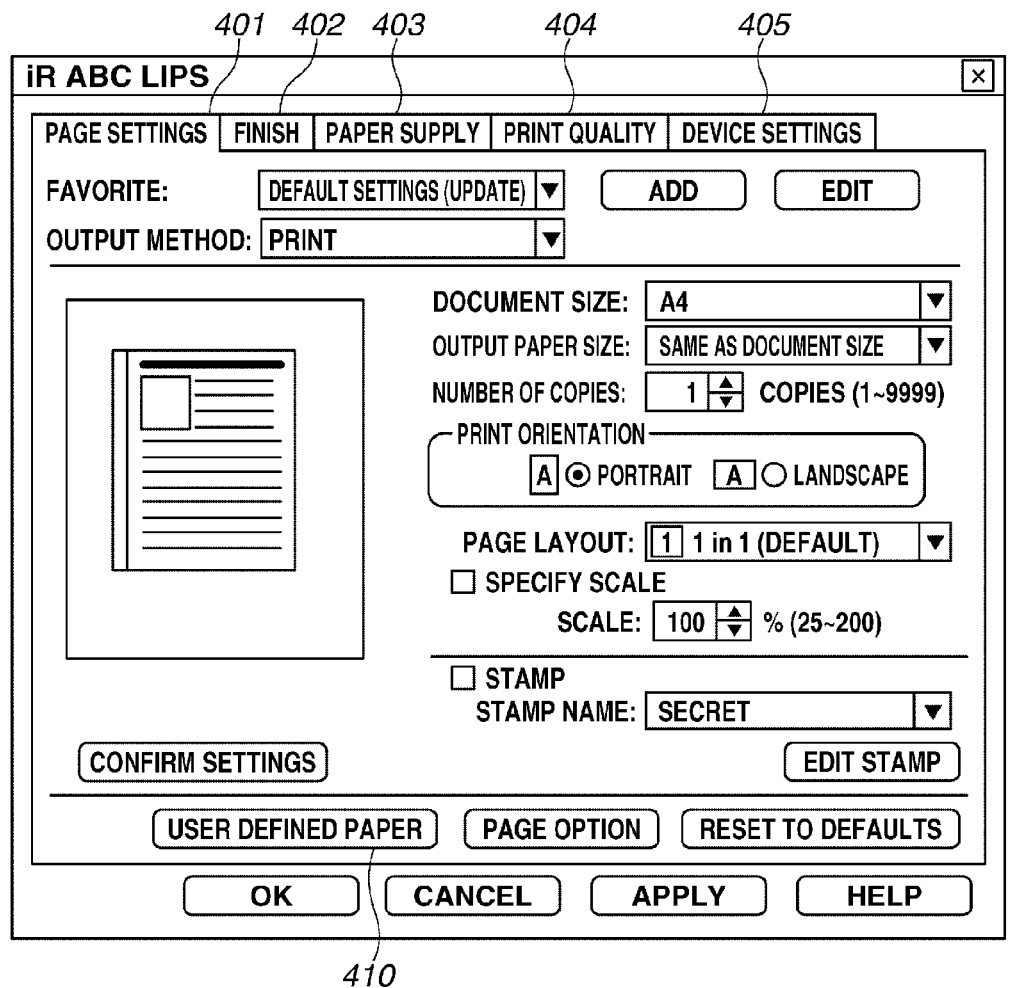
FIG. 4 illustrates an example of UI for setting a printer driver initial value of the custom tool.

FIG. 4 illustrates a printer driver UI (initial setting value customization UI) for customizing initial setting values of the printer driver. The custom tool 300 is loaded as a part of the applications 201 illustrated in FIG. 2 and is executed by the CPU 1 of the host computer 3000. This UI illustrated in FIG. 4 is displayed when the user presses the button 311 in the UI illustrated in FIG. 3. The custom tool 300 functions as a setting unit of the host computer 3000 under the control of the CPU 1. Such a setting unit, for example, displays, on a CRT, a UI for configuring document property settings and device property settings, such as the UI illustrated in FIG. 4. In a UI for configuring printer driver settings displayed during a typical installation, a document property UI for configuring document settings and a printer property UI for configuring device settings are not displayed simultaneously within a single UI. However, in the printer driver UI for customization according to the exemplary embodiment of the present invention, the custom tool 300 directly uses a printer driver module to perform the display. Accordingly, a document property UI for configuring document settings and a printer property UI for configuring device settings can be displayed simultaneously within a single UI as illustrated in FIG. 4.

In FIG. 4, four UIs including a page setting UI 401, a finish UI 402, a paper supply UI 403, and a print quality UI 404 can be displayed as the document property UIs. A device setting UI 405 is also displayed as the printer property UI. The initial setting values of the document properties and the initial setting values of the printer properties are accepted through the UIs 401 to 405. Settings that are not to be customized are grayed out as in a button 410 in the UI illustrated in FIG. 4 so as not to accept an input from the user. Thus far, a method for changing the initial values of the print setting values to be displayed by default through the printer driver UI realized by the custom tool 300 has been described.

Figure 5:
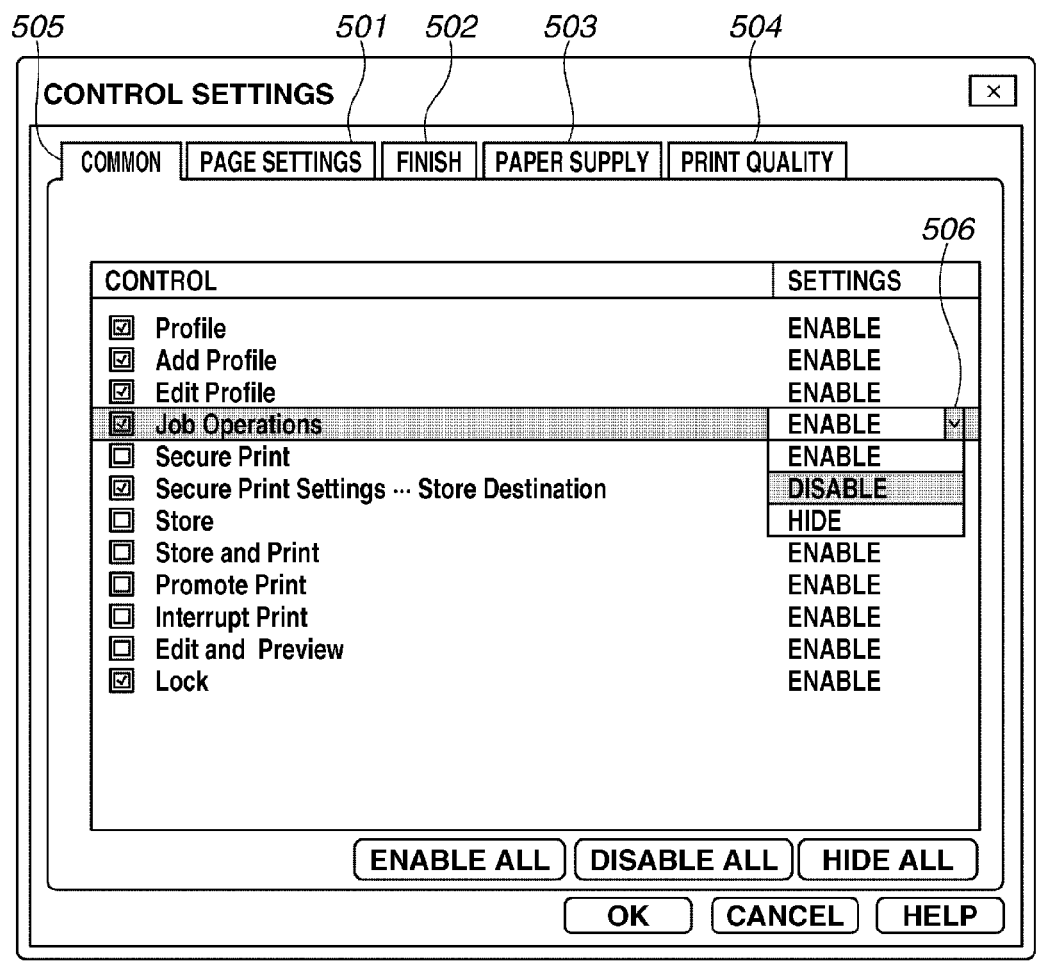
FIG. 5 illustrates an example of a display setting UI for a printer driver of the custom tool.

FIG. 5 illustrates a UI (document property display control setting UI) for controlling a display of the document properties of the printer driver to limit a user input. The UI illustrated in FIG. 5 is displayed on the display 10 of the host computer 3000 when the user presses the button 321 in the UI illustrated in FIG. 3. In the UI illustrated in FIG. 5, display control settings can be set to page settings 501, a finish 502, a paper supply 503, print quality 504, and common settings 505. The page settings 501, the finish 502, the paper supply 503, and the print quality 504 allow the user to configure the settings for the display controls corresponding to the document property UIs illustrated in FIG. 4. The common setting 505 allows the user to configure the settings for the display control that is common to the aforementioned display controls. A specific example of the settings for a control item "Job Operations" is listed in a pull-down 506. One of "enable" (i.e., normal display), "disable" (i.e., display is always disabled), and "hide" can be specified. Similarly, one of "enable," "disable," and "hide" can be set individually for each of the remaining control items, and thus the display controls in the document property UI can be customized Upon receiving these settings, the custom tool 300 edits a setting file of the printer driver. Disabling of a display can be achieved by graying out an item so as not to allow the user to operate on the item.

Figure 6A:
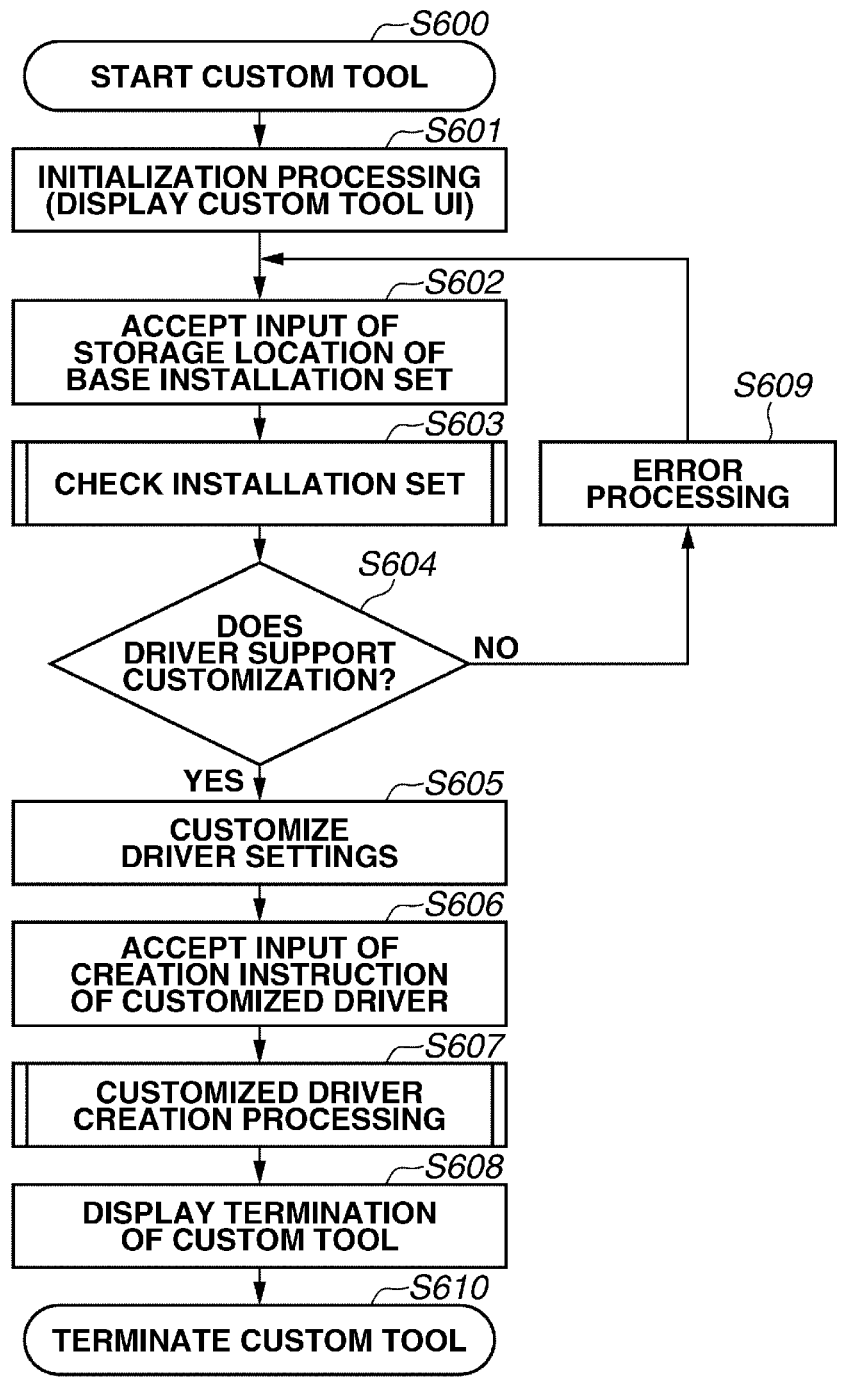
FIG. 6A is a flowchart illustrating basic operations of the custom tool.
Figure 9A:
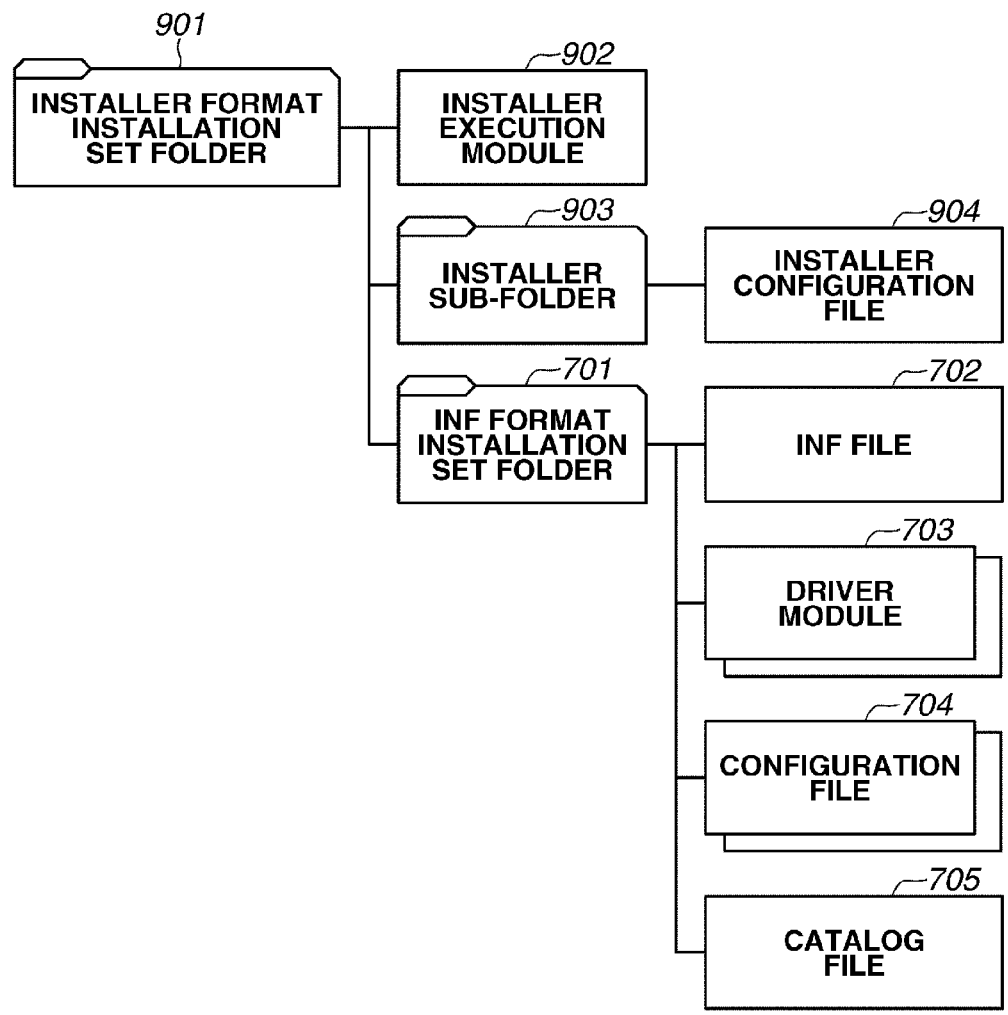
FIG. 9A illustrates an installer format installation set.

Basic operations of the custom tool 300 will now be described with reference to the flowcharts illustrated in FIGS. 6A to 6C. In each step of the basic operations, the custom tool 300 executed by the CPU 1 of the host computer 3000 is the operating nucleus. Once a user starts the custom tool 300 in step 5600, in step 5601, the custom tool 300 goes through initialization processing. Specifically, the custom tool 300 displays the UI illustrated in FIG. 3 onto the display 10. In step S602, the custom tool 300 accepts from the user an input specifying a storage location of an installation set for a printer driver to be customized, through the UI illustrated in FIG. 3. FIG. 7A illustrates an exemplary folder structure of an INF format installation set, which is to be customized by the custom tool 300. FIG. 7A illustrates merely an example of an installation set for a printer driver. Although details will be given later, FIG. 9A is also an example of an installation set for a printer driver. Such an installation set for a printer driver may also be referred to as a driver or a driver program in some cases. An INF format installation set folder 701 stores an INF file 702, driver modules 703, setting files 704, and a catalog file 705 of the printer driver.

FIG. 7B illustrates an example of contents of the INF file 702 in which installation information of the printer driver is written. The INF file 702 is referenced by the OS 205 when the printer driver is installed onto the OS 205. Information written in the INF file 702 will be described with reference to the example illustrated in FIG. 7B starting from the beginning of the INF file 702. A section 711 for "Version," which is a basic information piece, appears at the beginning of the INF file 702. The section 711 includes a DriverVer key 7112 that indicates a driver version and a CatalogFile key 7113 that indicates the name of the catalog file 705. Version information is written as a value of the DriverVer key 7112, and the name of the catalog file 705 is written as a value of the CatalogFile key 7113.

Next, a section 712 is placed to describe the names of printer models that are compatible with the INF format installation set. The section 712 lists, as keys, the names of printer models that are compatible with the installation set for the printer driver. As the values of these keys, section names that describe configuration modules and files included in the printer drivers for those models are specified. Any character strings can freely be defined as the value of the keys except forbidden characters. In the example illustrated in FIG. 7B, a section named "ABC" is defined for a model "Canon ABC LIPS." Under an "ABC" section 731, file names of the driver modules 703, the setting files 704, and the catalog file 705 that are included in the printer driver for the model "Canon ABC LIPS" are written. A setting file to be customized is specified as a value of a DataFile key 7131. Although file names of other modules are also written under the "ABC" section 713, those file names are omitted in FIG. 7B for the sake of simplicity. A "Strings" section 714 is located at the end of the INF file 702. In the "Strings", character strings are described which are displayed on the UI through the OS 205 during installation processing using the INF format installation set.

Figures 7A, 7B:
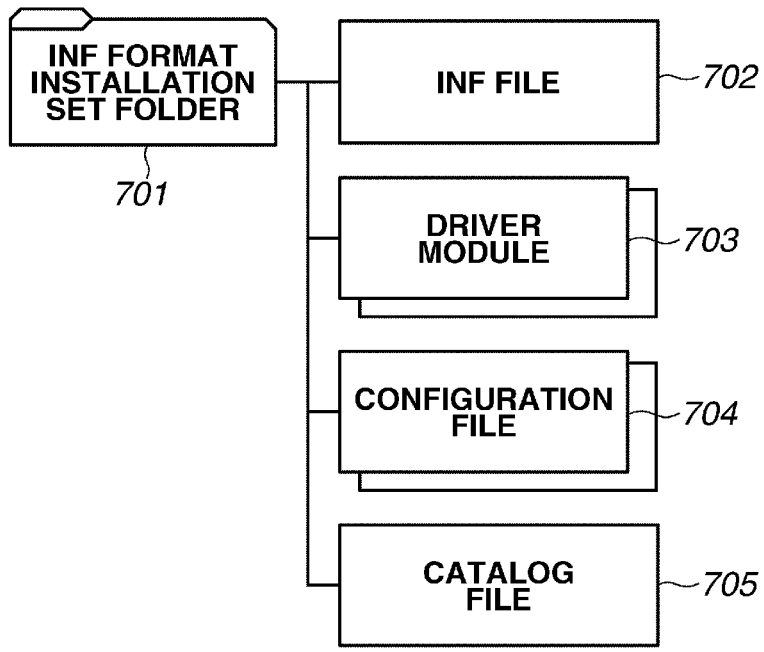
FIG. 7A illustrates an exemplary folder structure and an exemplary file structure of an installation set.
FIG. 7B illustrates an exemplary folder structure and an exemplary file structure of an installation set.
Figure 7C:
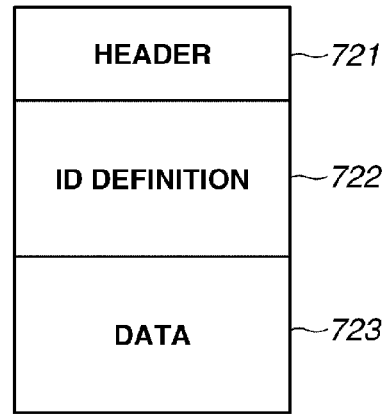
FIG. 7C illustrates an exemplary folder structure and an exemplary file structure of an installation set.

FIG. 7C illustrates an exemplary data format of the setting file 704, which is one of the files included in the printer driver. The setting file 704 is specified through the DataFile key 7131 under the section 713, which is a section for each model in the INF file 702. Therefore, a different setting file can be associated with each model. The setting file 704 includes, as internal data, a header 721, an identification (ID) definition 722, and data 723. The ID definition 722 stores, in pairs, an ID of a data piece stored in the data 723 and a storage location (address) of the data piece. Then, these pairs are stored in the number which corresponds to the number of the IDs. The custom tool 300 of the exemplary embodiment modifies the value of data that corresponds to an ID defined for customization. If an ID for customization data to be used in the ID definition 722 has not been defined, a new ID that corresponds to that customization data is added to the ID definition 722. When an installed printer driver becomes active, the printer driver reads the setting values in the setting file 704 and reflects the read setting values onto the print settings displayed on a print setting screen that is displayed by the printer driver. If the setting file 704 has been customized, the printer driver reflects the customized setting values within the setting file 704 onto the printer driver. For example, the printer driver reflects in advance preset settings of frequently used print setting values (e.g., two-sided, 2 in 1, and so on) onto the printer driver. Then, by installing the customized driver, the frequently used print setting values, default print setting values, and print setting values which the user can set are set in the printer driver.

Figure 7D:
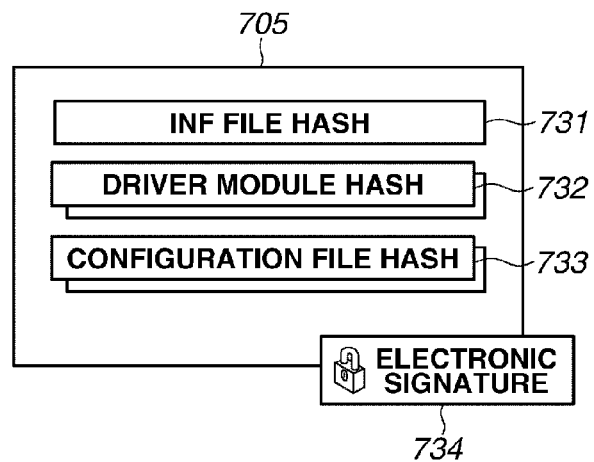
FIG. 7D illustrates an exemplary folder structure and an exemplary file structure of an installation set.

FIG. 7D illustrates an exemplary data structure of the catalog file 705, which is one of the files included in the printer driver. The catalog file 705 holds hash values 731-733 of module groups and file groups which constitute the installation set in the INF format. The catalog file 705 includes a hash value 731 of the INF file 702, hash values 732 of the driver modules 703, and hash values 733 of the setting files 704. In addition, an electronic signature 734 can be appended to the catalog file 705. The electronic signature 734 can be appended through two methods respectively for a general distribution use and for a specific use. In the case of the general distribution use, after evaluation, a development vendor of the installation set applies to Microsoft (registered trademark) Corporation and the electronic signature 734 is given. In the case of the specific use, the development vendor gives the electronic signature 734 on its own. After verifying the electronic signature 734 of the catalog file 705, the stored hash values 731 to 733 are compared with the hash values of the respective files. This processing makes it possible to verify whether the installation set has been modified. If the hash values match with each other, it is determined that the installation set has not been modified. An INF format installation set on which this determination has been made is referred to as a signed INF format installation set. If the hash values do not match with each other, it is determined that the installation set has been modified. An INF format installation set on which this determination has been made is referred to as a signature-corrupted INF format installation set.

Referring back to FIG. 6A, in step S603, the custom tool 300 checks the specified installation set. This processing will be described later in detail with reference to FIG. 6B. In step S604, if the custom tool 300 determines that the printer driver does not support customization (NO in step S604), the custom tool 300 proceeds to step S609. In step S609, the custom tool 300 carries out error processing and then returns to step S602 to accept an instruction on the storage location of an installation set. Meanwhile, in step S604, if the custom tool 300 determines that the printer driver supports customization (YES in step S604), the custom tool 300 proceeds to step S605. In step S605, the custom tool 300 controls the CRTC 6 to enable configuration of settings for customizing the printer driver through the UIs on the display 10 described with reference to FIGS. 3 to 5. Through the UIs illustrated in FIGS. 3 to 5, the custom tool 300 accepts settings for customizing the printer driver. In step S606, the custom tool 300 accepts an instruction for creating a customized driver when the user presses the "create" button 340 in the UI illustrated in FIG. 3. Then, in step S607, the custom tool 300 creates a customized driver in accordance with the settings obtained in step S606. This processing in step S607 will be described later in detail with reference to FIG. 6C. After the printer driver is customized in step S607, in step S608, if the user instructs termination of the custom tool 300, in step S610, the custom tool 300 is terminated.

Figure 6B:
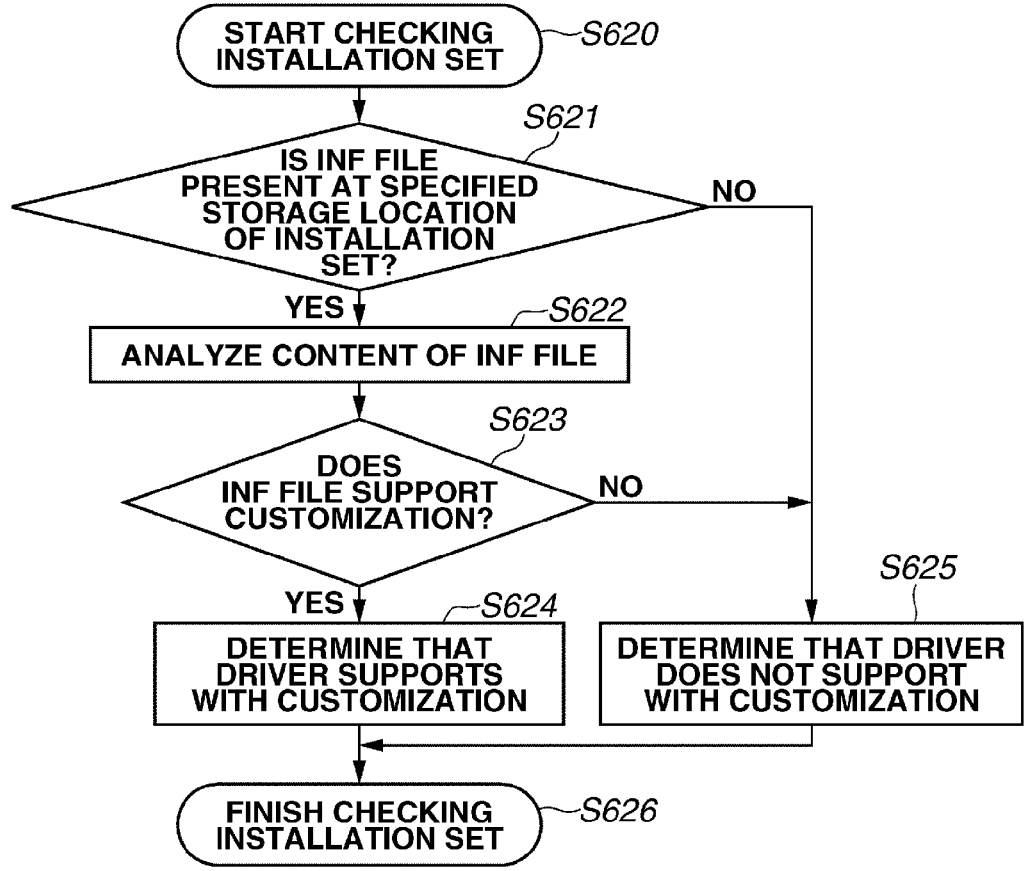
FIG. 6B is a flowchart illustrating basic operations of the custom tool.
Figure 6C:
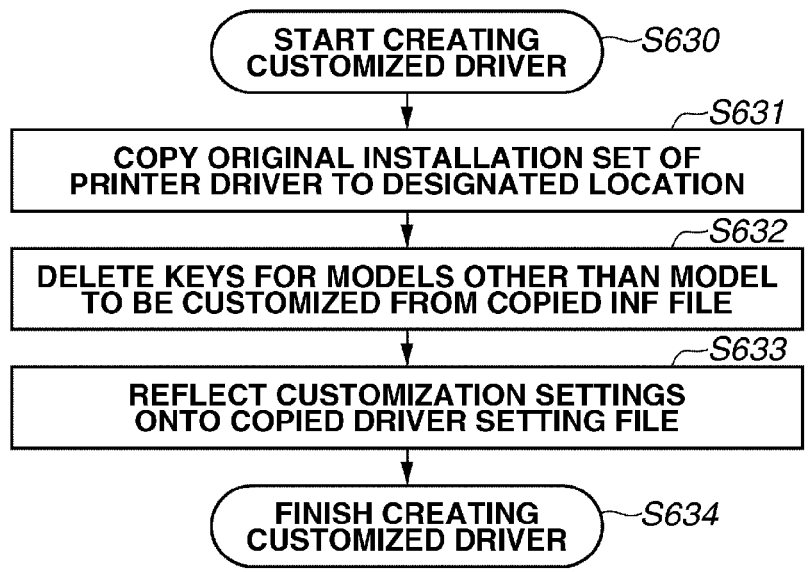
FIG. 6C is a flowchart illustrating basic operations of the custom tool.

FIG. 6B illustrates a flowchart of processing for checking whether a given installation set supports customization to be performed by the custom tool 300 of a conventional art. This processing will be described in detail with reference to the flowchart in FIG. 6B. This processing is carried out in step S603 of the flowchart of the conventional art illustrated in FIG. 6A. In step S621, the custom tool 300 determines whether an INF file 702 is present in the storage location of the installation set for a base printer driver that has been specified in step S602. If the INF file 702 is present in the specified storage location (YES in step S621), the custom tool 300 proceeds to step S622. If the INF file 702 is not present in the specified storage location (NO in step S621), the custom tool 300 proceeds to step S625. In step S622, the custom tool 300 reads the contents of the sections 7111, 7112, and 7141 in the INF file 702, which describes installation information of the printer driver, as illustrated in FIG. 7B. In step S623, the custom tool 300 determines whether the specified printer driver supports customization to be performed by the custom tool 300, based on the read contents. If the INF file 702 supports customization to be performed by the custom tool 300 (YES in step S623), the custom tool 300 proceeds to step S624. Meanwhile, if the INF file 702 does not support customization by the custom tool 300 (NO in step S623), the custom tool 300 proceeds to step S625. In step S624, the custom tool 300 determines that the installation set specified in step S602 supports customization to be performed by the custom tool 300. Alternatively, in step S625, the custom tool 300 determines that the installation set specified in step S602 does not support customization by the custom tool 300.

Figure 7E:
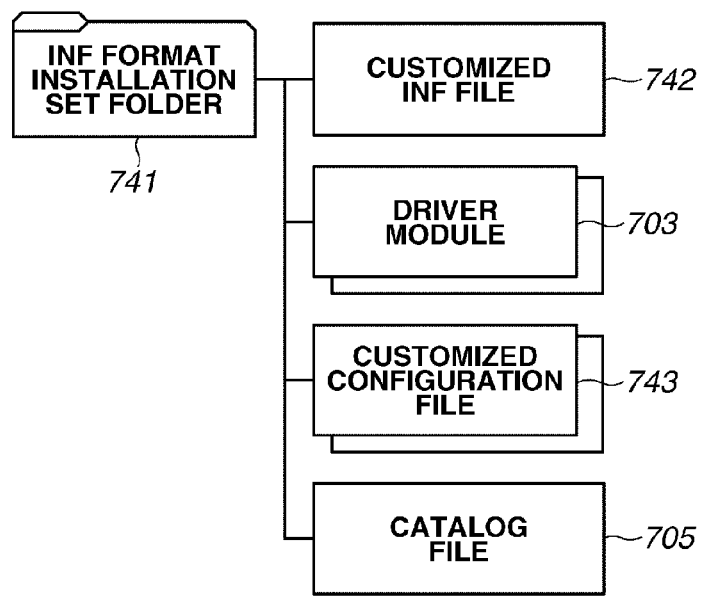
FIG. 7E illustrates an exemplary folder structure and an exemplary file structure of an installation set.

Processing for creating a customized driver of the conventional art will now be described in detail with reference to FIG. 6C. In the conventional art, this processing is carried out in step S607 of the flowchart illustrated in FIG. 6A. Through this processing, a customized INF format driver installation set 741 illustrated in FIG. 7E is created in the designated location of the customized driver that has been specified in the display field 331. In the installation set 741, the INF file 702 and the setting files 704 are replaced respectively by a customized INF file 742 and customized setting files 743.

In step S631, the custom tool 300 copies the folder structure and the files of the installation set in the storage location of the installation set of the base printer driver that has been specified in step S602, to a designated location of the customized driver specified in the display field 331. In step S632, the custom tool 300 deletes keys of models other than the model to be customized from the section 712 of the copied INF file 702 to create the customized INF file 742. In step S633, the custom tool 300 reflects the customization settings onto the copied setting files 704 to create the customized setting files 743. Thus, the customized driver installation set 741 is created.

Thus far, a method for customizing a printer driver has been described. Next, a method generally used to install a printer driver on the OS 205 will be described. There are at least two methods that can be employed to install a printer driver. A first method uses an OS function that uses an INF format installation set. A second method uses the installation set in an installer format.

Figure 8A:
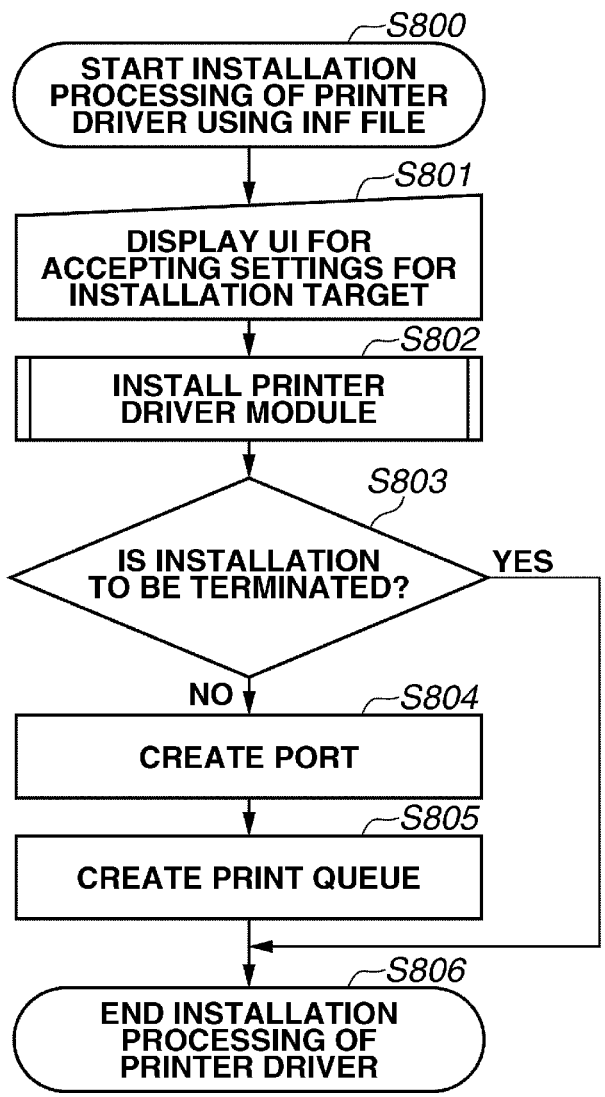
FIG. 8A is a flowchart illustrating installation processing using an information (INF) file.
Figure 8B:
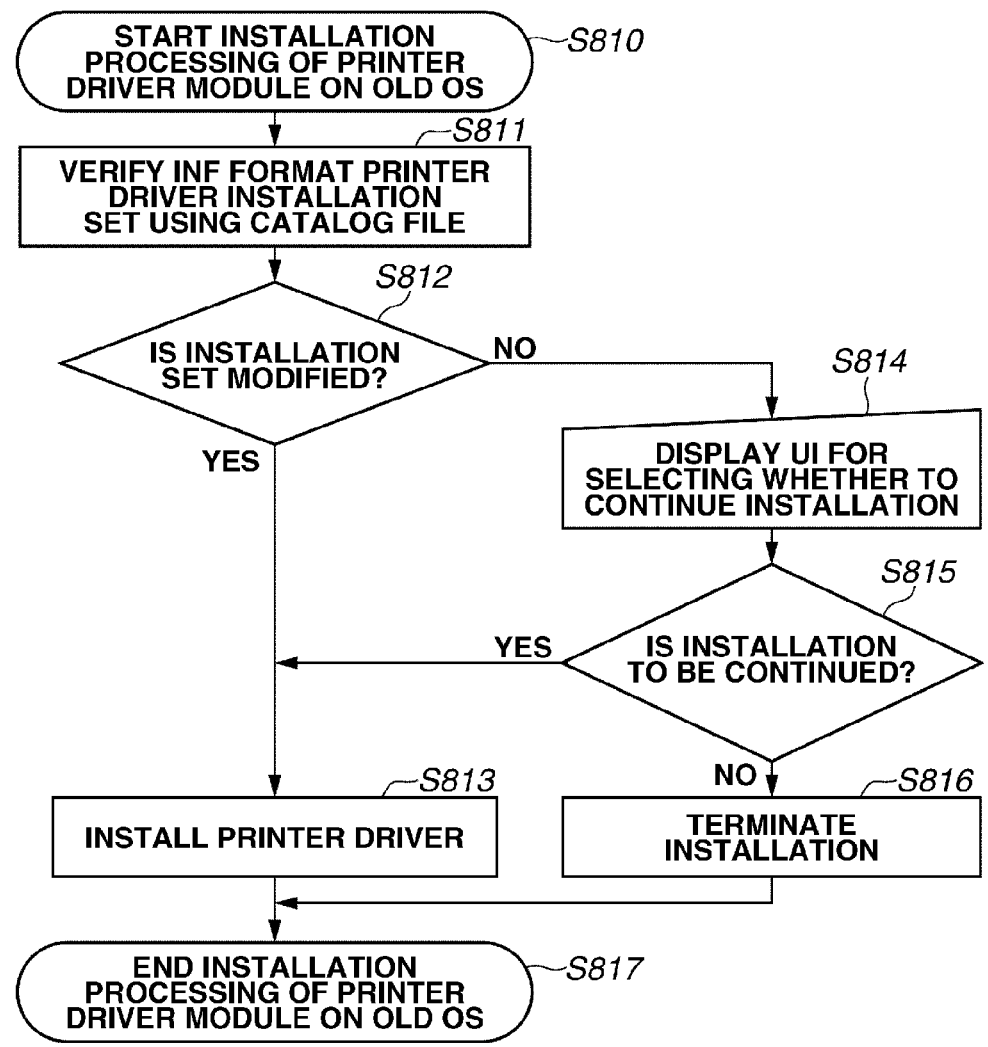
FIG. 8B is a flowchart illustrating installation processing using an information (INF) file.
Figure 8C:
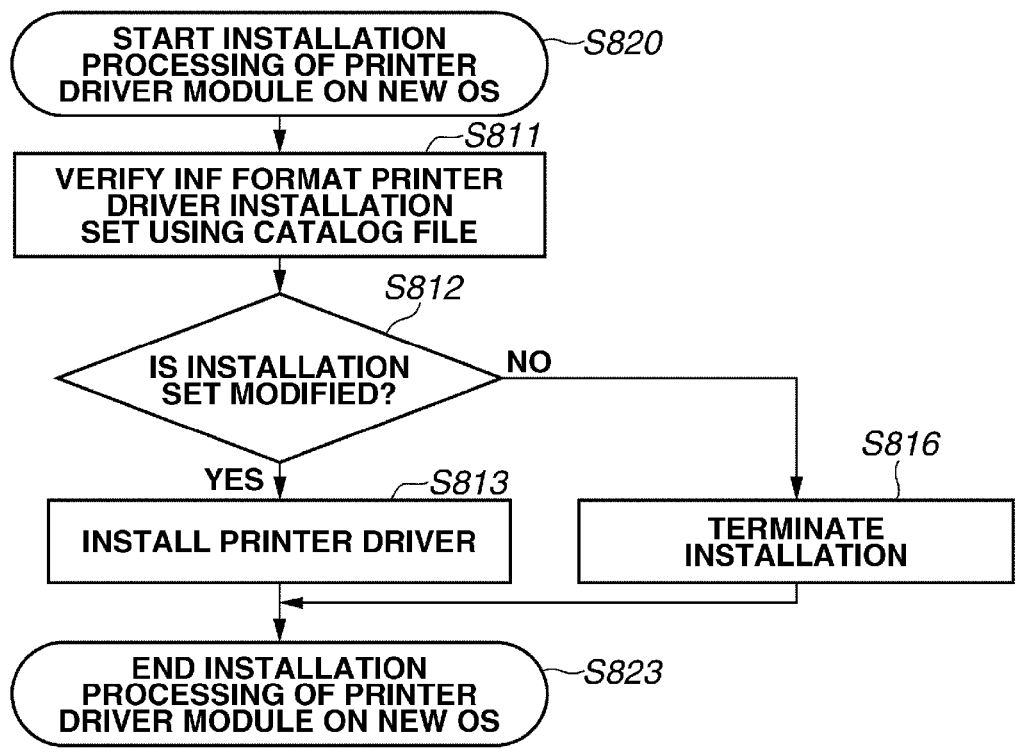
FIG. 8C is a flowchart illustrating installation processing using an information (INF) file.

A processing flow of the first installation method in which an INF file is used will be described with reference to a flowchart in FIG. 8A. In this case, a printer driver can be installed even when a vendor that provides the printer driver does not prepare an installer. The operating nucleus in this flowchart is the OS 205, and the OS 205 is realized using the CPU 1 of the host computer 3000. The processing starts when the OS 205 receives a request from a user to start installation of the printer driver. In step S801, the OS 205 controls the CRTC 6 to display a UI on the display 10 for accepting settings of an installation target. Specifically, the OS 205 accepts from the user a specified output port directed to the printer, an INF file of the printer driver to be installed, and the model name of the printer through the UI. Upon accepting those information pieces, in step S802, the OS 205 starts installation processing of the printer driver. In step S802, the OS 205 checks the installation set. Contents of this processing differ between an existing OS and a new OS which the exemplary embodiment of the present invention assumes. The new OS, which the exemplary embodiment of the present invention assumes, detects whether there is inconsistency between the catalog file and the installation set, and if there is inconsistency between the catalog file and the installation set, installation is terminated. FIG. 8B illustrates an example processing flow by an old OS, and FIG. 8C illustrates an example processing flow by the new OS. Differences in the processing between the old OS and the new OS will be described later with reference to FIGS. 8B and 8C. In step S803, if the OS 205 determines to terminate the installation in a process of installation processing of the printer driver (YES in step S803), the OS 205 proceeds to step S806 to terminate the installation. Meanwhile, if the OS 205 determines to continue with the installation (NO in step S803), in step S804, the OS 205 creates an output port directed to the printer that has been specified in step S801. In step S805, the OS 205 creates a print queue and then terminates the installation processing.

The installation processing of the printer driver in a case of the old OS will be described with reference to FIG. 8B. In step S811, the OS verifies the INF format installation set using the catalog file. Then, in step S812, the OS determines whether the installation set has been modified. If the installation set has not been modified (NO in step S812), the OS proceeds to step S813. In step S813, the OS carries out installation processing of the modules and the setting files as to the printer driver of the install target model. Meanwhile, if the installation set has been modified (YES in step S812), in step S814, the OS controls the CRTC 6 to display on the display 10 a UI that allows the user to decide whether to continue with the installation. If the user chooses to continue with the installation (YES in step S815), the OS proceeds to step S813 to carry out the installation processing of the printer driver. Meanwhile, if the user chooses not to continue with the installation (NO in step S815), the OS proceeds to step S816. In step S816, the OS displays a message notifying the user that "installation will be terminated" and decides to terminate the installation processing. In this way, in the old OS, even if there is inconsistency between the installation set for the printer driver and the catalog file, the printer driver can be installed according to the user's choice.

Next, the installation processing of the printer driver on the new OS will be described with reference to FIG. 8C. In the case of the new OS, steps S814 and S815 which are present in the case of the old OS, are not present. Accordingly, if the OS detects inconsistency between the installation set for the printer driver and the catalog file, the installation is terminated without providing the user with the choices. The processing in the new OS reflects increased security concerns in recent years. However, there is a problem in the new OS that the new OS does not allow installation of a customized printer driver.

A processing flow in the second installation method in which an installer format installation set is used will now be described. The installation set in an installer format has an advantage in that the installation processing is simpler for the user. FIG. 9A illustrates an exemplary structure of an installer format installation set folder 901. An installer execution module 902 for the driver (hereinafter, referred to as an installer), an installer sub-folder 903 which the installer 902 refers to, and the INF format installation set folder 701 are present immediately under the folder 901. The sub-folder 903 stores an installer setting file 904. The installer 902 refers to the setting file 904 and carries out processing in accordance with the contents in the setting file 904. The folder 701 stores the INF format installation set illustrated in FIG. 7A.

Figure 9B:
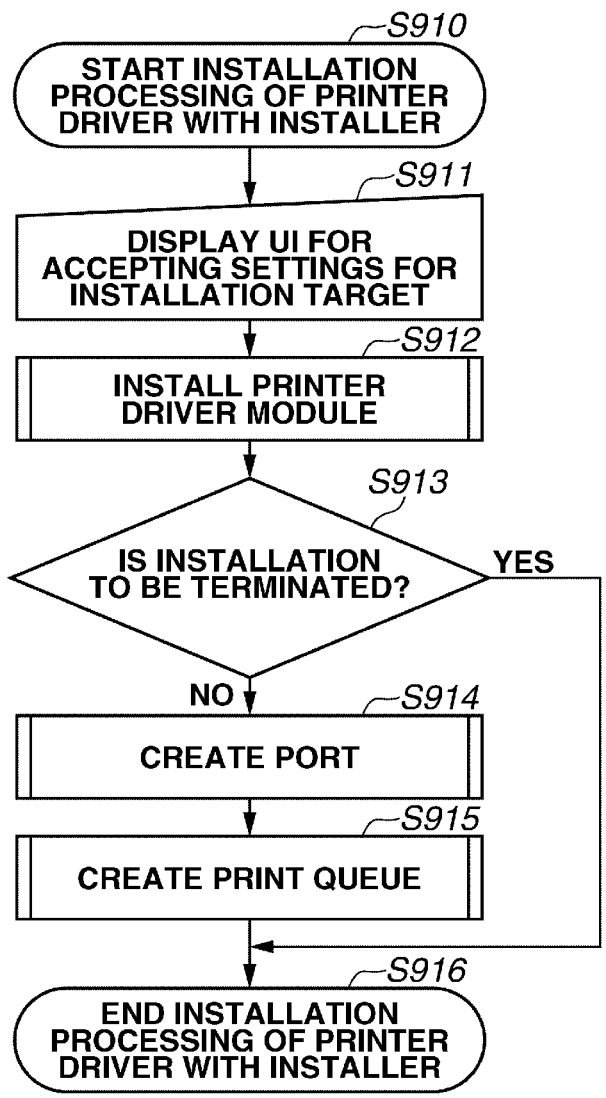
FIG. 9B is a flowchart illustrating installation processing of the installation set.

FIG. 9B illustrates a flowchart of the installation processing by the installer 902. The operating nucleus in this flowchart is the installer 902. This processing is carried out using the CPU 1 of the host computer 3000. The processing starts when the installer 902 accepts a request from a user to start executing the installer 902. The basic processing flow illustrated in FIG. 9B is similar to that in FIG. 8A except for two different points.

A first difference lies in a UI displayed in step S911 for configuring installation settings Unlike the INF format installation set, since the installation set for the printer driver to be installed is the folder 701 illustrated in FIG. 9A, the user does not need to specify the storage location thereof. Accordingly, the installer 902 defines the UI for configuring the installation settings on its own and displays the UI on the display 10 by controlling the CRTC 6. Then, the installer 902 accepts a specified output port directed to the printer and the name of a model to be installed from the user through the aforementioned UI. In a UI for selecting the name of the model to be installed, the installer 902 displays a list of candidate models that can be installed based on the contents of the INF file 702 and accepts a user's choice.

A second difference lies in that the installer 902 calls an application programming interface (API) provided by the OS 205 in steps S912, S914, and S915. When the installer 902 calls the API, the OS 205 carries out processing that corresponds to steps S802, S804, and S805.

When a printer driver is customized by an existing custom tool 300, a printer driver is created that lacks consistency between the installation set for the printer driver and the catalog file as illustrated in FIG. 7E. If that installation set is installed on a new OS, the new OS detects inconsistency between the installation set for the printer driver and the catalog file as in step S812, and as a result, the installation processing is terminated. Thus, there arises a problem that a printer driver that has been customized by the existing custom tool 300 cannot be installed on the new OS.

Hereinafter, processing according to a first exemplary embodiment for handling the above-described problem will be described. First, customization processing of the custom tool 300 will be described. Then, installation processing of a printer driver using an installation set in a customized installer format will be described. Now, the customization processing of the installation set by the custom tool 300 of the first exemplary embodiment will be described. Through this customization processing, the custom tool 300 creates an installation set in an installer format having a folder structure illustrated in FIG. 11.

In the conventional art, only the INF format installation set illustrated in FIG. 7A is supported as an base installation set for a customized driver. Therefore, in the dialog box that appears when "open" is selected in the menu 301 in FIG. 3, path designation directed to an INF file is accepted. The custom tool 300 of the first exemplary embodiment creates an installer format installation set. Therefore, the installer format installation set folder 901 illustrated in FIG. 9A can also be specified in the dialog box that appears when "open" is selected in the menu 301 in FIG. 3.

Figure 10A:
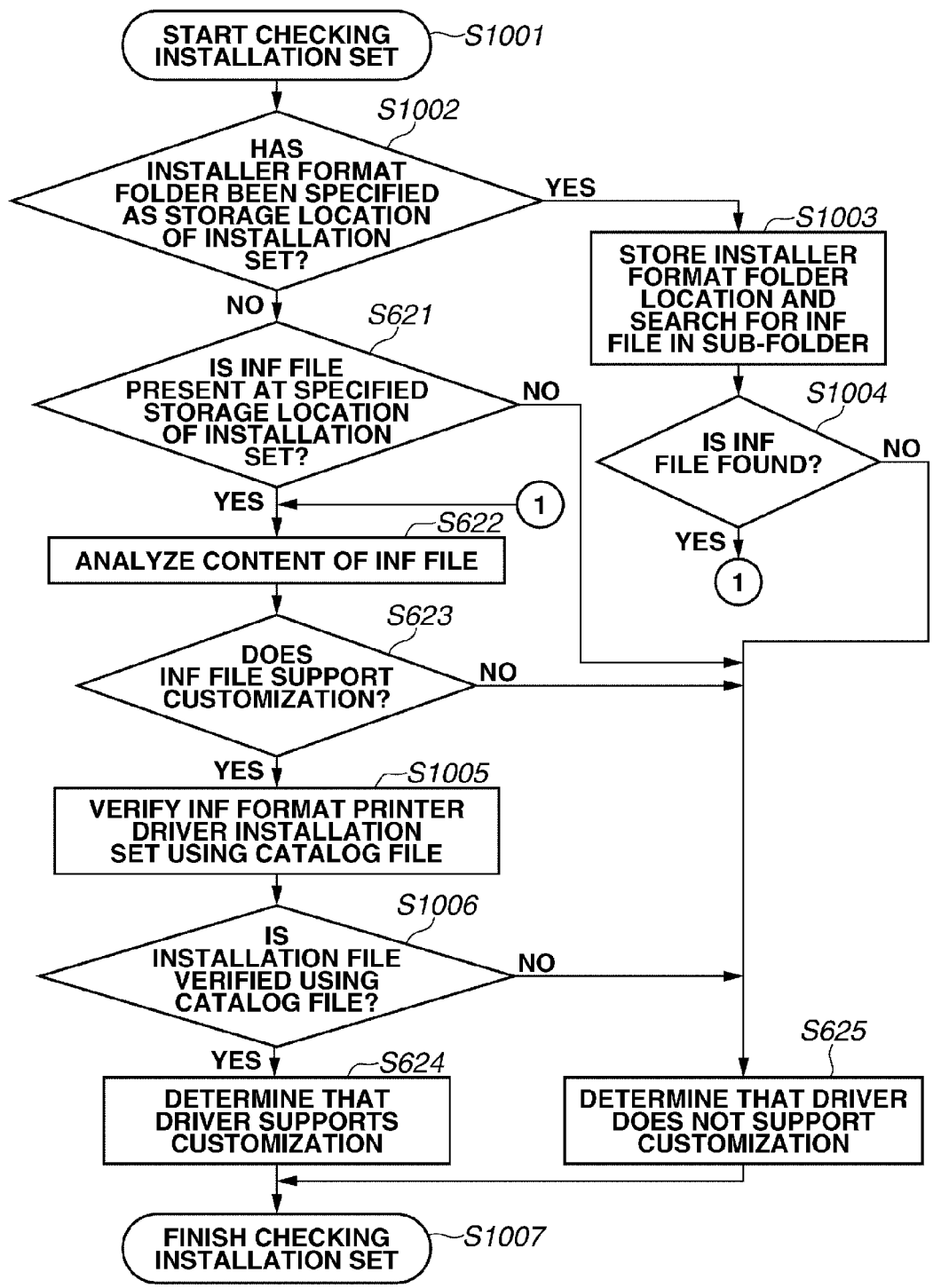
FIG. 10A is a flowchart illustrating customization processing and installation processing of a first exemplary embodiment.
Figure 10B:
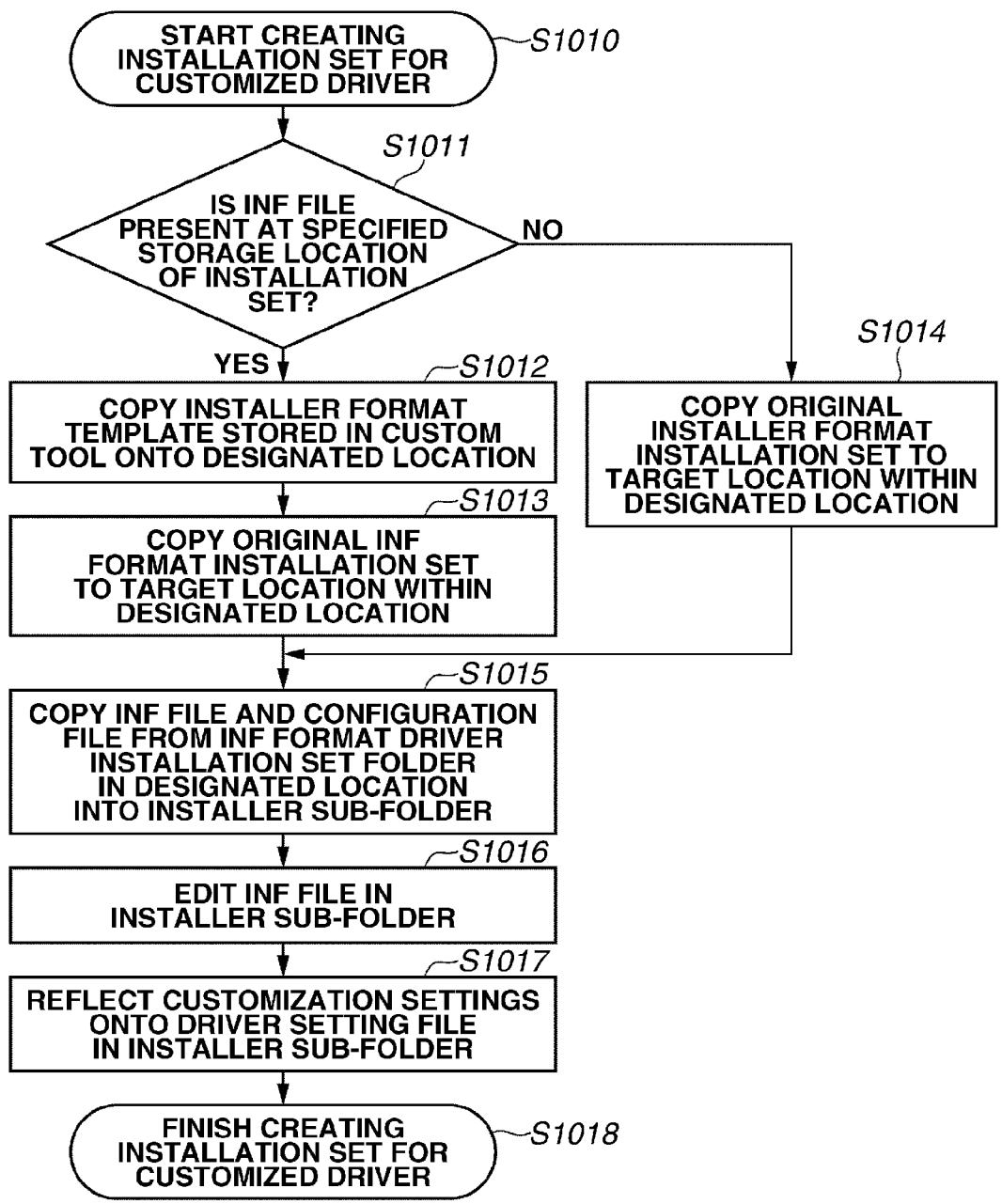
FIG. 10B is a flowchart illustrating customization processing and installation processing of a first exemplary embodiment.

FIGS. 10A and 10B illustrate flowcharts of the customization processing of the installation set. The processing flow in FIG. 10A illustrates check processing of the installation set in the first exemplary embodiment. The custom tool 300 carries out this processing in step S603 instead of the processing in FIG. 6B. The processing flow in FIG. 10A differs from the processing flow in FIG. 6B in two points. The operating nucleus in the processing in FIGS. 10A and 10B is the custom tool 300.

A first difference lies in a processing path of steps S1002 to S1004. The processing in these steps are added because, in addition to the INF file 702, the installer format installation set folder 901 illustrated in FIG. 9A has become available in the dialog box that appears when "open" is selected in the menu 301 of FIG. 3. In step S1002, the custom tool 300 determines whether a path specified in the aforementioned dialog box is a folder. If a folder has been specified (YES in step S1002), the custom tool 300 proceeds to step S1003. Alternatively, if a file has been specified (NO in step S1002), the custom tool 300 determines that the INF file 702 has been specified and proceeds to step S621. In step S1003, the custom tool 300 stores the specified folder as the installer format installation set. In addition, the custom tool 300 searches through subfolders to locate the INF file 702. In step S1004, if the custom tool 300 has located the INF file 702 (YES in step S1004), the custom tool 300 proceeds to step S622. Meanwhile, if the custom tool 300 has been unable to locate the INF file 702 (NO in step S1004), the custom tool 300 proceeds to step S625. Then, in step S625, the custom tool 300 determines that the printer driver does not support customization. A second difference lies in a processing path of steps S1005 and S1006. To install the printer driver on the new OS, an installer execution module 1102 (hereinafter, referred to as an installer) needs a signed INF format installation set 701. Accordingly, in step S1005, the custom tool 300 verifies the base installation set for the customized driver using the catalog file. In step S1006, the custom tool 300 determines whether there is consistency between the base installation set for the customized driver and the catalog file.

If there is consistency between the installation set and the catalog file (YES in step S1006), the custom tool 300 proceeds to step S624. Meanwhile, if there is inconsistency between the installation set and the catalog file (NO in step S1006), the custom tool 300 proceeds to step S625. The remaining steps in the processing flow of FIG. 10A are the same as those in FIG. 6B.

The processing flow in FIG. 10B is the customization processing of the printer driver according to the first exemplary embodiment. The custom tool 300 carries out this processing in step S607 of FIG. 6A instead of the processing in FIG. 6C. In step S1011, the custom tool 300 determines whether an INF file has been specified in a path specified in the dialog box that appears when "open" is selected in the menu 301 of FIG. 3. If an INF file has been specified (YES in step S1011), the custom tool 300 determines that the INF format installation set illustrated in FIG. 7A has been specified as the installation set for the printer driver to be customized Then, the custom tool 300 proceeds to step S1012. Meanwhile, if an INF file is not specified (NO in step S1011), the custom tool 300 determines that the installer format installation set illustrated in FIG. 9A has been specified as the installation set for the printer driver to be customized Then, the custom tool 300 proceeds to step S1014. In step S1012, since the INF format installation set has been specified as the base installation set, the installer 1102 and an installer sub-folder 1103 are not present in the installation set. Thus, to create the installation set illustrated in FIG. 11 through customization, the custom tool 300 copies an installer format installation set for the printer driver stored in the custom tool 300 to a folder at a designated location specified by operating the button 330. In addition, in step S1013, the custom tool 300 copies the INF format installation set to be customized to a location of the folder 701 in FIG. 11.

Figure 11:
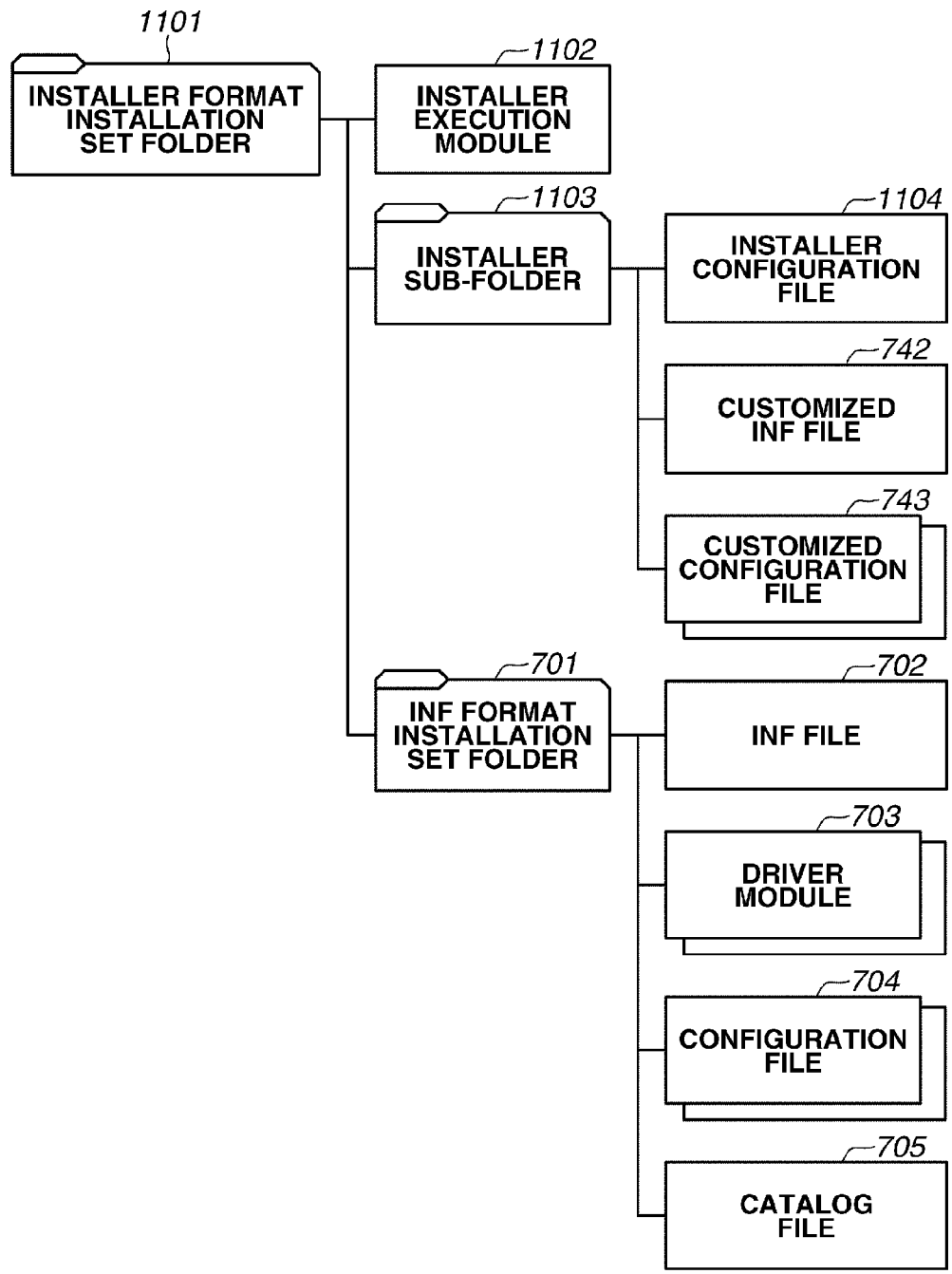
FIG. 11 illustrates a structure of a customized installation set of the first exemplary embodiment.

The custom tool 300 proceeds to step S1014 when the installer format installation set has been specified as a base installation set. In step S1014, the custom tool 300 copies the specified installer format installation set to a designated location path in the display field 331. In step S1015, the custom tool 300 copies the INF file 702 within the folder at the designated location and a setting file to be customized among the setting files 704, to the installer sub-folder 1103. Thereafter, in steps S1106 and S1107, the custom tool 300 configures the customization settings for the files within the installer subfolder 1103 similar to steps S632 and S633. Through this processing, the customized installer format installation set of the first exemplary embodiment illustrated in FIG. 11 is created.

Next, installation processing of the printer driver with the installer 1102 illustrated in FIG. 11 will be described with reference to FIG. 10C. In step S1021, the installer 1102 displays a UI for configuring installation settings. This processing is similar to that in step S911 of FIG. 9B. This processing differs from step S911 only in the information on selectable candidate models to be installed to which the installer 1102 refers in order to display a UI for selecting a model to be installed. The installer 1102 displays a list of selectable candidate models to be installed based on the contents of the customized INF file 742 illustrated in FIG. 11. In steps S912 to S915, the installer 1102 installs the printer driver on the OS 205 using the INF format installation set 701 that has consistency between the catalog file and the installation set in accordance with setting information for the installer 1102 set in step S1021. The processing is identical to the processing indicated with identical numbers in FIG. 9B. Thus, the descriptions thereof will be omitted here.

In steps S1022 to S1024, the installer 1102 replaces the setting files 704 installed on the OS 205 with the customized setting files 743 to apply the customization settings to the printer driver installed on the OS 205. Specifically, in step S1022, the installer 1102 stops a print spooler (not illustrated). The print spooler is a module that controls an overall print function in the OS 205 and is one of the modules that constitute the OS 205. In step S1023, the installer 1102 replaces the setting files 704 stored in a driver related folder in the OS 205 with the setting files 743. Then, in step S1024, the installer 1102 starts the print spooler. Stopping the print spooler is one method to prevent failure in replacing the setting files if printing is carried out while replacing the setting files 704 with the customized setting files 743. A method for preventing such failure is not limited to the one described above, and any other appropriate method be employed. However, in the OS 205, replacing the setting files after installing the printer driver is not assumed. Accordingly, the replacement of the setting files by the installer 1102 in step S1023 affects print processing in the OS 205. Measures for reducing this influence on printing while replacing the setting files will be described later in a third exemplary embodiment.

According to the first exemplary embodiment, a customized printer driver can be installed on an OS that terminates installation when the OS detects installation of a printer driver that lacks consistency between a catalog file and an installation set.

The INF format installation set folder 701 of the first exemplary embodiment illustrated in FIG. 11 stores an uncustomized installation set. Thus, there is a possibility that a user finds the INF file 702 and installs the printer driver on an information processing apparatus through an installation method using the INF file as described with reference to FIG. 8A. In that case, there arises a problem that an uncustomized printer driver is installed on the OS contrary to the user's desire. Meanwhile, the customized driver cannot be installed on the new OS only by replacing the folder 701 illustrated in FIG. 9A with the folder 741 illustrated in FIG. 7E. In a second exemplary embodiment, a method for handling these two problems will be described.

Hereinafter, processing according to the second exemplary embodiment for solving the problem will be described. First, customization processing by the custom tool 300 will be described. Then, installation processing of a printer driver using a customized installer format installation set will be described.

Figure 12A:
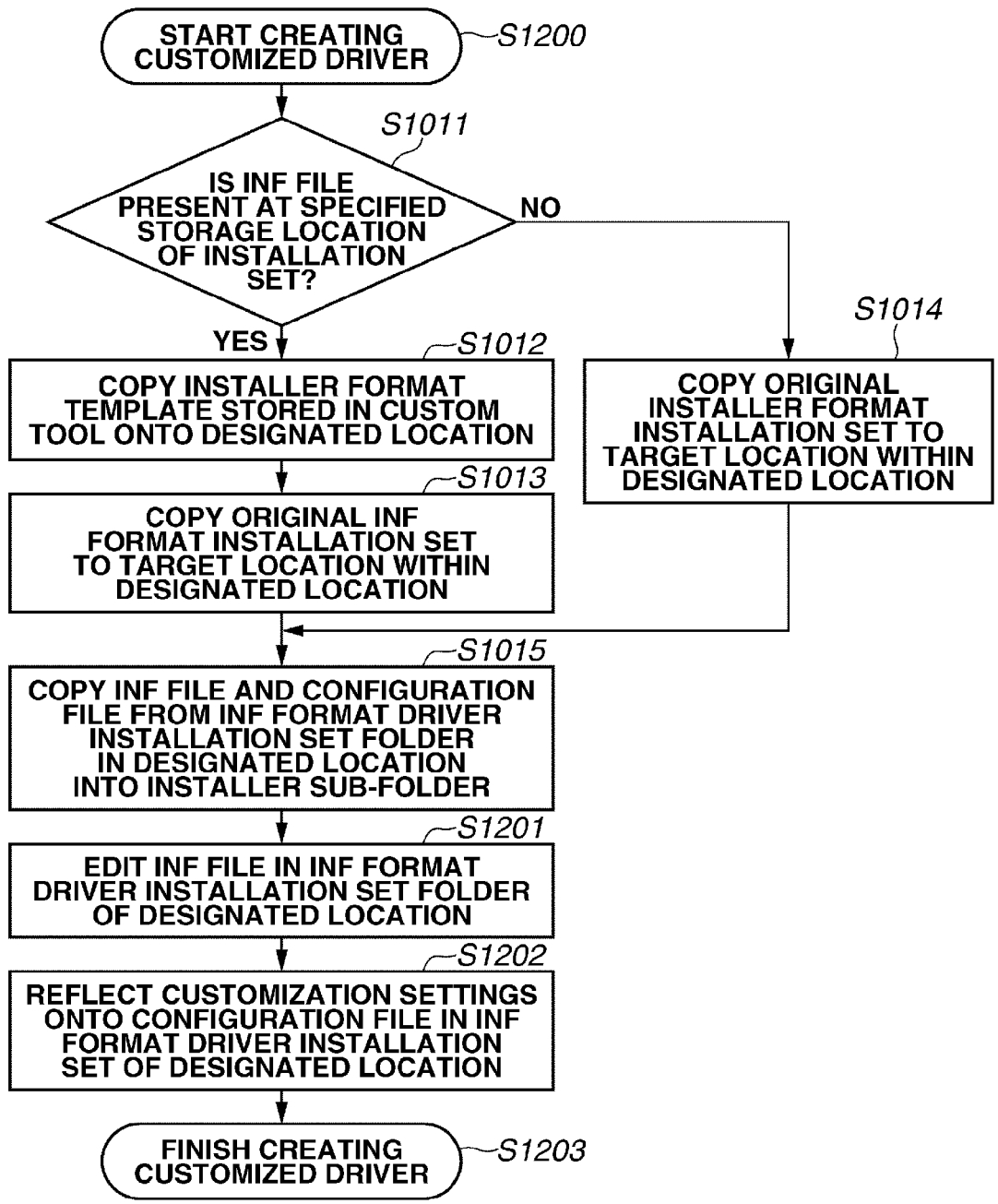
FIG. 12A is a flowchart illustrating customization processing and installation processing of a second exemplary embodiment.
Figure 13:
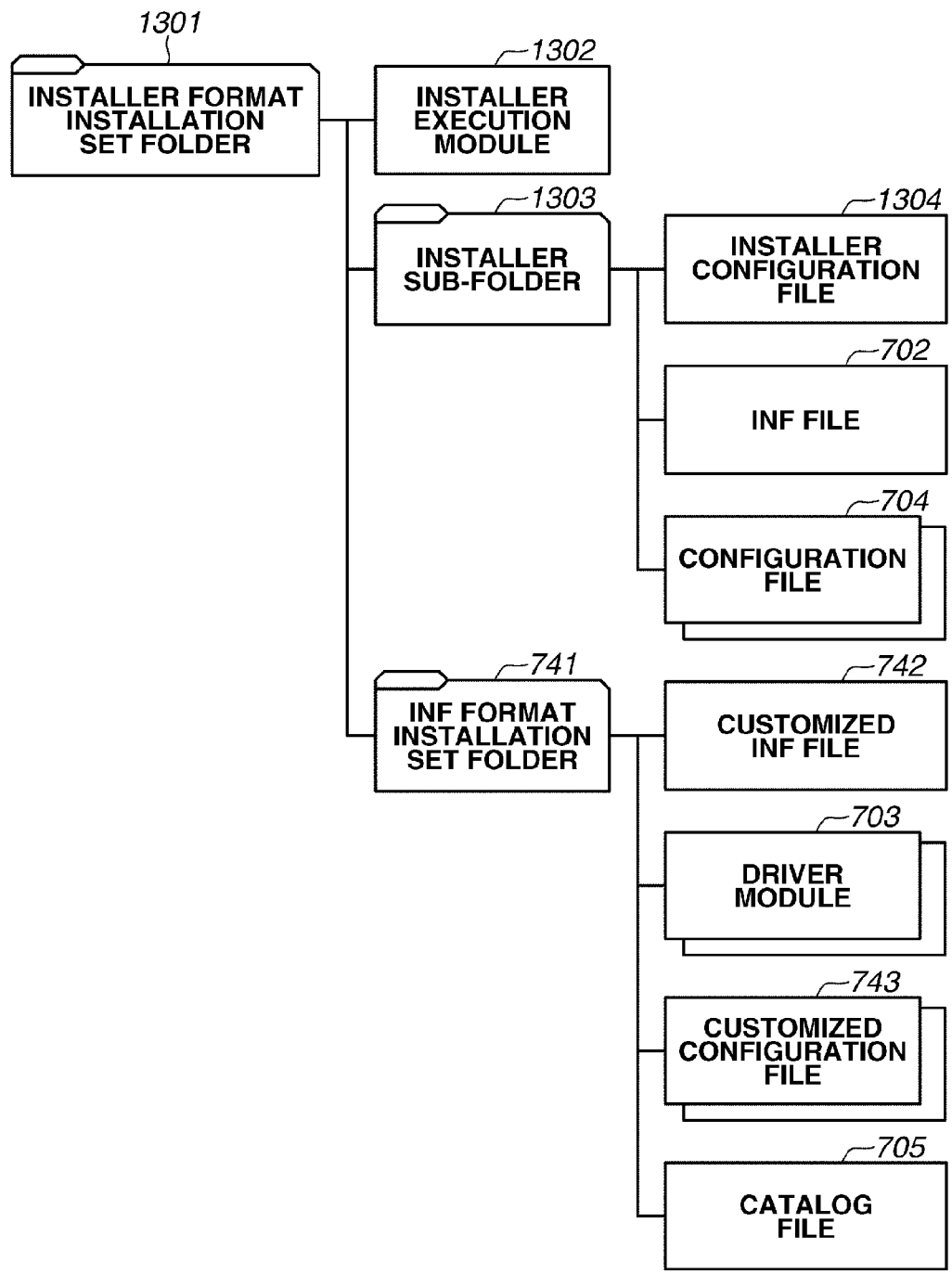
FIG. 13 illustrates a structure of a customized installation set of the second exemplary embodiment.

Customization processing of a printer driver by the custom tool 300 according to the second exemplary embodiment will now be described. Through this customization processing, the custom tool 300 of the second exemplary embodiment creates an installer format installation set 1301 having a folder structure illustrated in FIG. 13. FIG. 12A illustrates a processing flow when the custom tool 300 creates the installation set for the printer driver. The custom tool 300 carries out this processing flow in step S607 of FIG. 6A. The processing in FIG. 12A differs from the processing in FIG. 10B in steps S1201 and S1202, that is, files to be customized are different. In steps S1201 and S1202, the custom tool 300 configures customization settings that are similar to those in steps S1016 and S1017 for the INF format installation set. The INF format installation set is placed in the folder 741 and has the folder structure illustrated in FIG. 13. Through this processing, the customized installer format installation set of the second exemplary embodiment illustrated in FIG. 13 is created. The processing in the remaining steps is identical to the steps designated with identical numbers in FIG. 10B. Thus, the descriptions thereof will be omitted here.

Next, installation processing of a printer driver with an installer execution module 1302 (hereinafter, referred to as an installer) according to the second exemplary embodiment will be described with reference to FIG. 12B. In step S1211, the installer 1302 displays a UI for configuring installation settings. This processing is similar to that in step S1021 of FIG. 10C. However, the second exemplary embodiment differs from the first exemplary embodiment in the storage location of the customized INF file 742. The installer 1302 refers to the customized INF file 742 to display a UI for selecting the name of a model to be installed. In step S1212, the installer 1302 temporarily stores the INF format installation set located under the folder 741 of FIG. 13 into a temporary folder (hereinafter referred to as a TEMP folder) which is prepared using a memory region of the RAM 2 by the OS 205. In step S1213, the installer 1302 overwrites files in the INF format installation set stored in the TEMP folder with the INF file 702 and the setting files 704 within the installer sub-folder 1303. Through the processing in steps S1212 and S1213, a signed INF format installation set prior to the customization is created in the TEMP folder. In step S1214, the installer 1302 installs the install target printer driver using the INF file 702 within the TEMP folder in a similar manner to step S912. The remaining processing is identical to the processing indicated with identical numbers in FIG. 10C. Thus, the descriptions thereof will be omitted here.

As described above, the custom tool 300 of the second exemplary embodiment creates the installation set 1301 having the structure illustrated in FIG. 13. The user can install a customized driver on the OS 205 by starting the installer 1302 of FIG. 13 to carry out the installation. Further, even if a user installs a printer driver through the installation method using the INF file described with reference to FIG. 8A, a customized printer driver is installed on an old OS having the determination processing of FIG. 8B. Further, the installation is stopped in a new OS having the determination processing of FIG. 8C. By creating the installation set having the folder structure illustrated in FIG. 13, an uncustomized printer driver can be prevented from being installed.

In the first and second exemplary embodiments, setting files are replaced with customized setting files for a printer driver. In the OS 205, replacing the setting files after installing the printer driver is not assumed. Accordingly, there is a problem that replacement of the setting files by the installer affects a print operation by the user. In a third exemplary embodiment, as a countermeasure for alleviating the problem, the installer makes a determination as to the OS environment, and thus the print spooler are not stopped or started on an old OS having the determination processing of FIG. 8B.

Figure 10C:
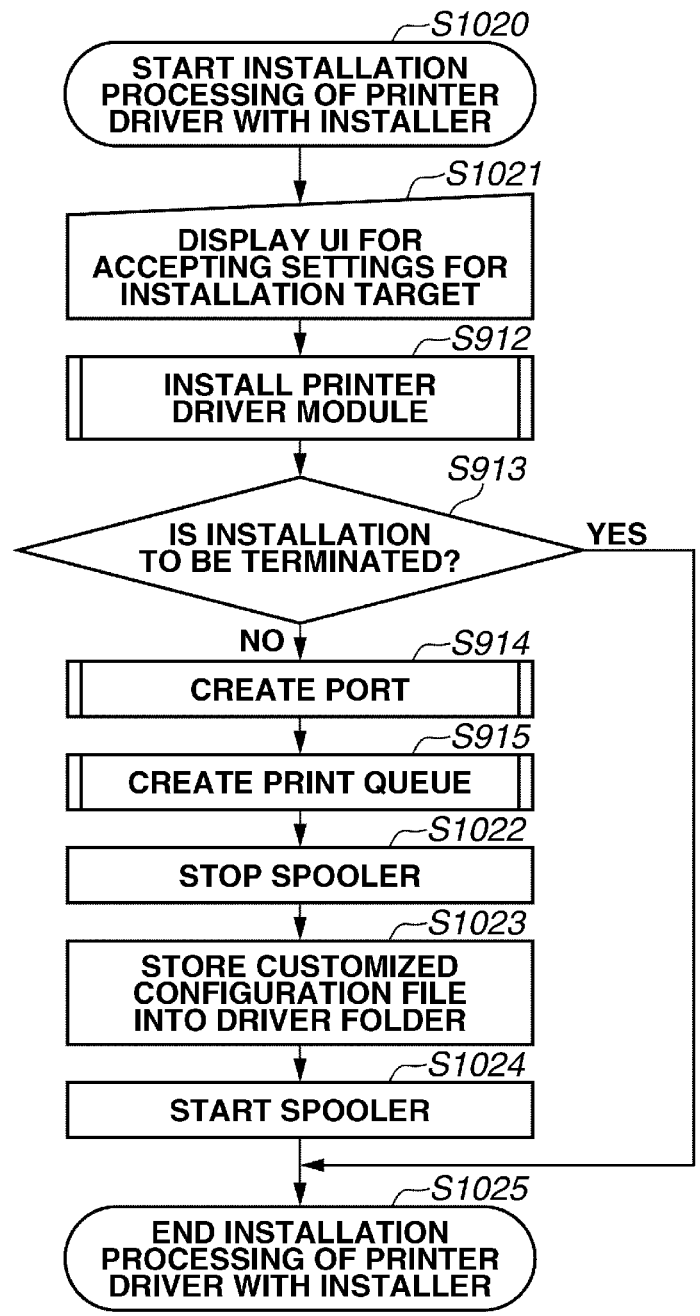
FIG. 10C is a flowchart illustrating customization processing and installation processing of a first exemplary embodiment.
Figure 14A:
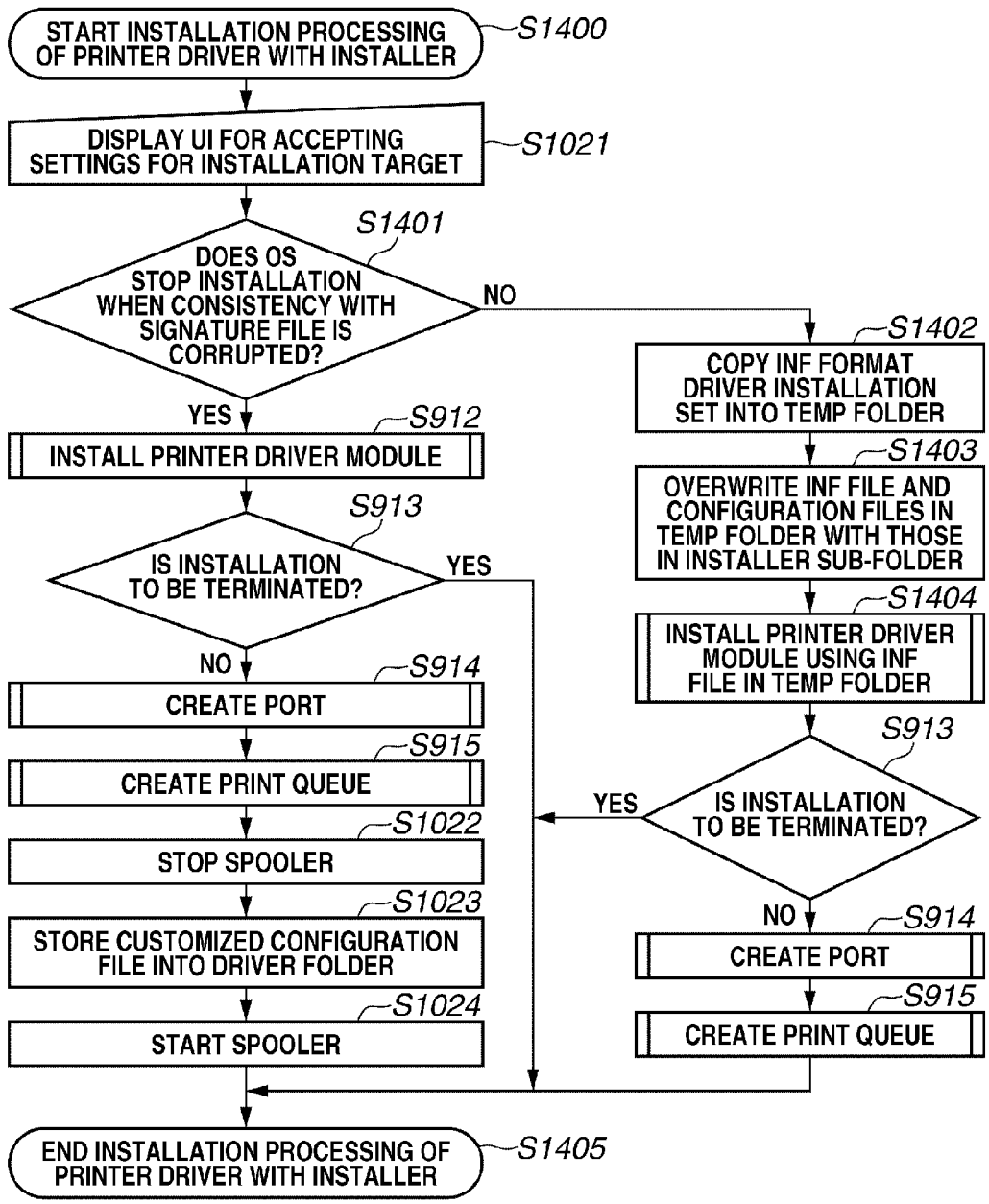
FIG. 14A is a flowchart illustrating installation processing of a third exemplary embodiment.

FIG. 14A illustrates a processing flow in which the installation processing of the first exemplary embodiment illustrated in FIG. 10C is extended. In this processing flow, step S1401 of determining the OS 205 is added between step S1021 and step S912 of the processing flow of FIG. 10C. In step S1401, the installer calls an API provided by the OS 205 to determine whether the OS 205 has the determination processing of FIG. 8B or the determination processing of FIG. 8C. If the OS 205 has the determination processing of FIG. 8B (NO in step S1401), the installer proceeds to step S1402. If the OS 205 has the determination processing of FIG. 8C (YES in step S1401), the installer proceeds to step S912. Through the processing in step S1402 and thereafter, a printer driver may be installed using an INF file of an OS function even if a signature of installation set is corrupted. Thus, the installer creates a customized INF format installation set in a TEMP folder from the installer format installation set of FIG. 11. In step S1402, the installer copies the signed installation set 701 illustrated in FIG. 11 into a TEMP folder. In step S1403, the installer overwrites files in the INF format installation set copied into the TEMP folder, with the INF file 742 and the setting files 743 within the installer sub-folder 1303. Through the processing in steps S1402 and S1403, a customized INF format installation set is created in the TEMP folder. In step S1404, the installer installs the install target printer driver using the INF file 742 in the installation set within the TEMP folder, in a similar manner to step S912. The processing in the remaining steps in FIG. 14A is identical to the steps with identical numbers in the installation processing of FIG. 10C, and thus the descriptions thereof will be omitted here.

Figure 12B:
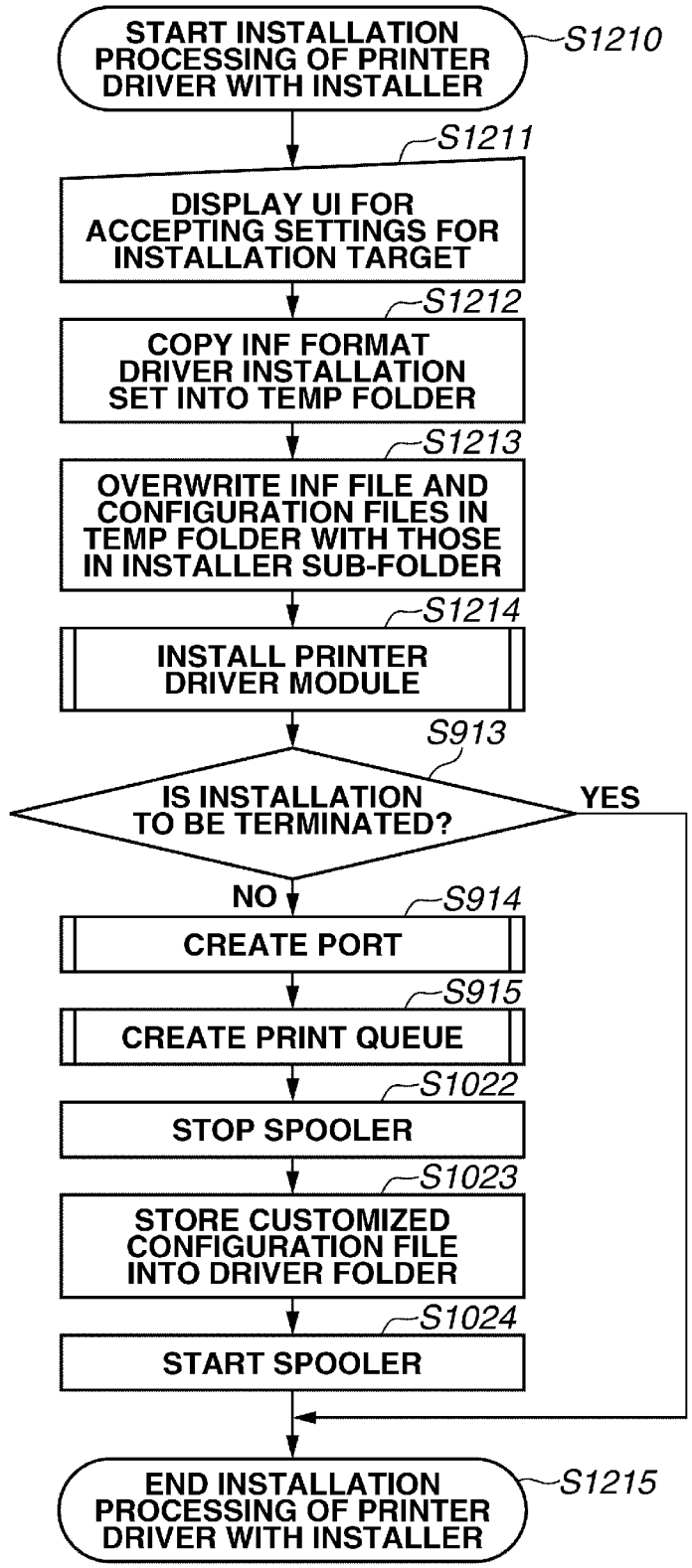
FIG. 12B is a flowchart illustrating customization processing and installation processing of a second exemplary embodiment.
Figure 14B:
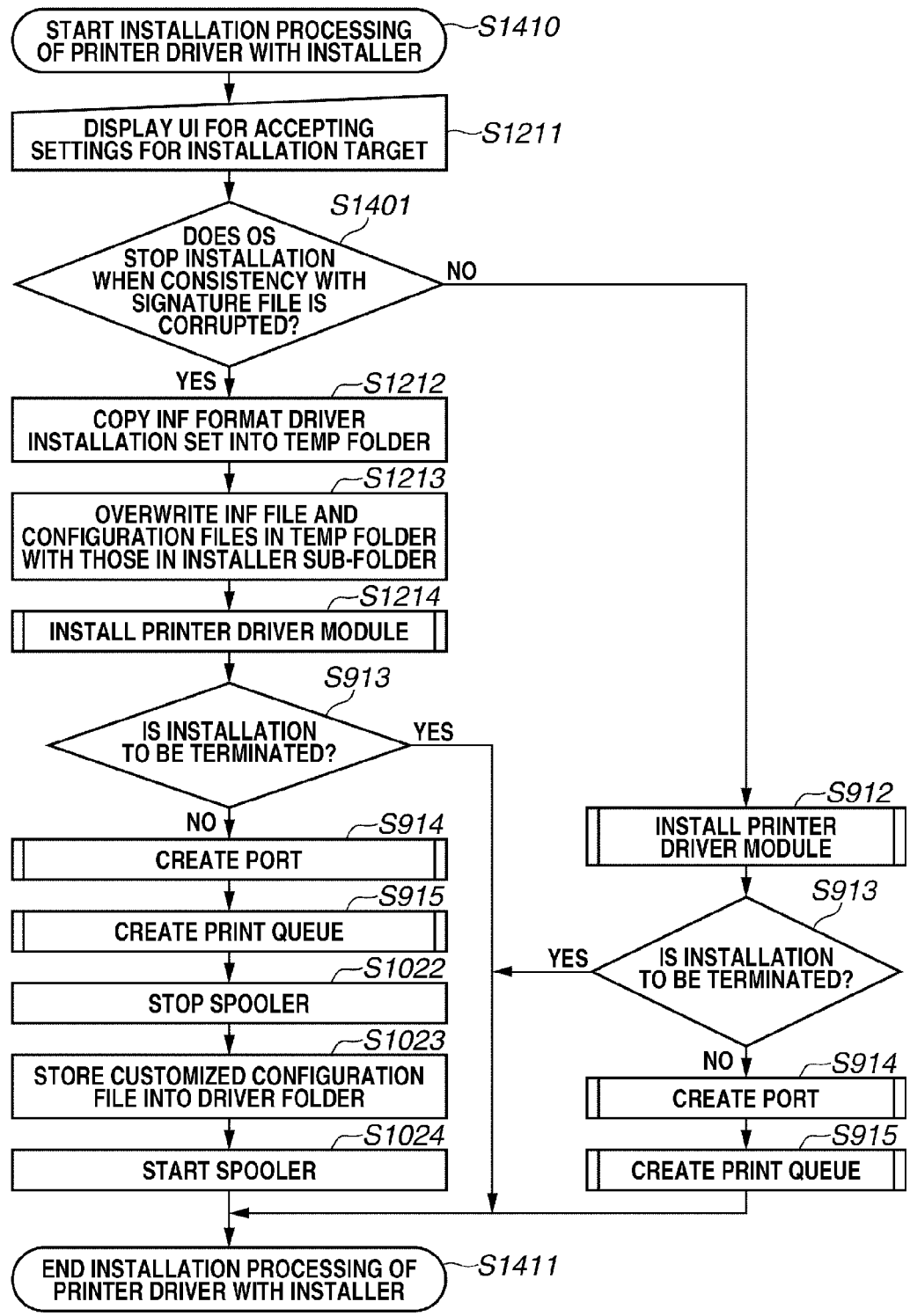
FIG. 14B is a flowchart illustrating installation processing of a third exemplary embodiment.

FIG. 14B illustrates a processing flow in which the installation processing of the second exemplary embodiment illustrated in FIG. 12B is extended. In this processing flow, step S1401 of determining the OS 205 is added between step S1211 and step S1212 of the processing flow of FIG. 12B. In step S1401, the installer calls an API provided by the OS 205 to determine whether the OS 205 has the determination processing of FIG. 8B or the determination processing of FIG. 8C. If the OS 205 has the determination processing of FIG. 8B (NO in step S1401), the installer proceeds to step S912. Meanwhile, if the OS 205 has the determination processing of FIG. 8C (YES in step S1401), the installer proceeds to step S1212. Through the processing in step S912 and thereafter, a printer driver may be installed using an INF file of an OS function even if a signature of the installation set corrupted. In that case, the installer installs the install target printer driver using the INF file 742 of the installer format installation set illustrated in FIG. 13, in a similar manner to step S912. The processing in the remaining steps in FIG. 14B is identical to the steps with identical numbers in the installation processing of FIG. 12B, and thus the descriptions thereof will be omitted here.

As described thus far, in an environment that allows a printer driver to be installed even with a signature-corrupted installation set by using an INF file of an OS function while the installer determines the OS environment, the printer driver is installed with the OS function using the INF file. Through this, the setting files are not replaced in such an OS environment, and thus influence on the print operation by the user caused by replacement of the setting files can be reduced.

In each of the exemplary embodiments of the present invention, there is a possibility that a malicious user may modify the customized INF file 742, the customized setting file 743, and installer setting files 1104 and 1304. To prevent such a modification, the custom tool 300 calculates keyed hash values of the above files and writes the keyed hash values in the installer setting files 1104 and 1304. A hash-based message authentication code (HMAC) is used for keyed-hashing, and the custom tool 300 and the installer 1102 or 1302 both store the same private key. In the final processing in FIG. 10B or in FIG. 12A, the custom tool 300 calculates the keyed hash values of the aforementioned files using the private key and writes the calculated keyed hash values into the installer setting file 1104 or 1304. The installer 1102 or 1302 calculates the keyed hash values of the aforementioned files at the start of the installation processing and compares the obtained keyed hash values with the values written in the installer setting file 1104 or 1304. If the hash values match with each other, the installer 1102 or 1302 continues with the installation processing. If the hash values do not match with each other, the installer 1102 or 1302 stops the installation processing Improper modifications made to the installer execution module 1102 or 1302 can be dealt with typically by adding an electronic signature to the installer execution module 1102 or 1302.

Although the setting files are replaced in the exemplary embodiments described above, as long as an installed driver can be modified, the method is not limited to replacing the setting files. For example, a setting file of an installed driver may be rewritten to be identical to a setting file which supports customization settings. After an uncustomized driver is installed on an information processing apparatus, a customized driver may be installed on the information processing apparatus through some other methods. In the present specification, the expression "to modify an installed driver" generally refers to a process for bringing an information processing apparatus into the above-mentioned state where a customized driver is installed.

In the exemplary embodiments described above, after the entire files within an installation set for a driver to be customized are installed, the installed driver is modified. However, even before all of the files within the installation set are installed, the installed files of the driver may sequentially be modified. For example, at a stage at which installation of a setting file is completed and an execution module is going to be installed, the installed setting file may be modified before starting installation of the execution module.

In the present specification, an installer format installation set folder as illustrated in FIG. 11 or 13 that is suitable for each of the exemplary embodiments has been described. However, other files and modules may also be included in each of the installation set folders. For example, a file and a module that are necessary for installing a device application may be included together with the driver. In addition, a driver module and a catalog file may also be included in the installer sub-folder 1103 or 1303. For example, including a driver module in an installation set folder may lead to a redundant configuration. However, if an existing installer is designed to mainly use an installer sub-folder, an exemplary embodiment of the present invention can be implemented while suppressing an improvement on the installer to the minimum. Thus, files and modules that can be placed within each folder are not limited and can be set in accordance with the design of the installer.

In the installation processing in each of the exemplary embodiments of the present invention, an installer installs an uncustomized driver and then modifies the installed driver. However, these operations do not need to be carried out successively. For example, the installer once terminates the installation processing at a point at which the installer has installed an uncustomized driver. Thereafter, the installer may be started again to resume the installation processing upon receiving an instruction from a user to resume the installation of the customized driver. Here, the installation processing is once terminated when the installation of the uncustomized driver is finished. However, the installation processing may instead be suspended. If the installation processing is to be suspended, the installer can inquire of the user whether to continue with the installation processing at a point at which the installation of the uncustomized driver is finished. Then, if the installer receives an instruction from the user to continue with the installation processing, the installer may resume the suspended installation processing. In this way, the operations in the installation processing do not need to be carried out successively. However, in each of exemplary embodiments, the entire installation processing is preferably completed at once. This is because if the installation processing is completed at once, the user's instruction operation can be omitted, and security requirements of the OS can be satisfied in a series of the installation processing flows.

In the exemplary embodiments of the present invention described above, when an installation set for a customized driver is installed, in addition to an INF file and a setting file, a driver module is also installed in each installation processing. However, if a driver of the same model as the customized driver is already installed, the driver module does not need to be installed, and only the INF file and the setting file, which affect the customization, may be installed. For that purpose, the installer needs to be modified as follows. When the installer starts installation, the installer inquires of the OS the name of the model of the installed driver. Then, the installer determines whether the obtained name matches with the name of the model within the INF file of the driver to be installed. If the names match with each other, the installer installs the INF file and the setting file of the customized driver. If the driver module is not installed, it is preferable for a security reason that the installer reissues a customized INF file and a catalog file based on the setting file and then installs the driver.

In the exemplary embodiments of the present invention, a printer driver has been described as an example suitable for the present invention. However, the present invention is not limited to a printer driver. For example, a scanner driver or a FAX driver may have the same configuration as the printer driver described in the exemplary embodiments of the present invention and the scanner driver or the FAX driver can be installed through the same processing. Further, the present invention is not limited to a driver for image processing. The exemplary embodiments of the present invention are advantageous when function settings (e.g., print settings) of a driver can be customized through a function setting screen (e.g., a printer driver UI capable of print settings) displayed by the driver.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(registered trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176024 filed Aug. 8, 2012, which is hereby incorporated by reference herein in its entirety.

The invention claimed is:

1. An information processing apparatus, comprising:
   A processor;
   a starting unit configured to start installation of a driver customized as to a function setting value that can be set in a function setting screen;
   a creation unit configured to create a customized driver including a catalog file in which a has value is written corresponding to the driver on which the customization has not yet been performed; and
   an installation unit configured to compare a hash value of a setting file of the driver on which the customization has not yet been performed included in the customized driver with the has value in the catalog file, and if the hash values match with each other, to install driver on which the customization has not yet been performed and to replace a setting filed of the installed driver with the setting file of the driver on which the customization has been performed included in the customized driver;
   wherein the starting unit, creation unit, and the installation unit are implemented at least in part by the processor executing at least one program;
   wherein the function setting value that can be set through the driver is determined based on a setting file of the driver, and wherein the installation unit modifies the driver by replacing a setting file of the installed driver with a setting file created through the customization.

2. The information processing apparatus according to claim 1, further comprising: a display unit configured to display a customization screen through which the customization is performed on the driver; and a creation unit configured, in response to receiving an instruction for creating a customized driver after the function setting value has been modified through the screen, to create the customized driver that includes the setting file of the driver on which the customization has not yet been performed and the setting file of the driver on which the customization has been performed.

3. The information processing apparatus according to claim 2, wherein the creation unit creates a customized driver that includes an installer and a setting file for the installer, wherein the starting unit starts installation upon startup of the installer, and wherein the installation unit installs the setting file of the driver on which the customization has not yet been performed, in accordance with the setting file for the installer, which is read upon the startup of the installer, and replaces the setting file of the installed driver with the setting file of the driver on which the customization has been performed, included in the customized driver.

4. The information processing apparatus according to claim 2, wherein the creation unit creates a customized driver that includes an installer and a setting file for the installer, wherein the starting unit starts installation upon startup of the installer, and wherein the installation unit temporarily stores into a memory a driver in which the setting file of the driver included in the customized driver on which the customization has been performed is replaced with the setting file of the driver on which the customization has not yet been performed, in accordance with the setting file for the installer, which is read upon the startup of the installer, installs the driver that is temporarily stored in the memory, and then replaces the setting file of the installed driver with the setting file created through the customization.

5. The information processing apparatus according to claim 4, wherein the creation unit stores the setting file of the driver on which the customization has not yet been performed into an installer sub-folder and creates a customized driver storing the setting file of the driver on which the customization has been performed in an INF format installation set folder, and wherein the installation unit temporarily stores into a memory a driver in which the setting file of the driver stored in the INF format installation set folder on which the customization has been performed is replaced with the setting file of the driver stored in the installer sub-folder on which the customization has been performed, in accordance with the setting file for the installer, which is read upon the startup of the installer, installs the driver that has been temporarily stored in the memory, and then replaces the setting file of the installed driver with the setting file created through the customization.

6. The information processing apparatus according to claim 1, wherein the installation unit stops a print spooler after installing the driver on which the customization has not yet been performed and modifies the installed driver while the print spooler is stopped.

7. The information processing apparatus according to claim 6, further comprising:
a determination unit configured to determine whether an operating system (OS) included in the information processing apparatus installs a signature-corrupted driver, wherein if the OS installs a signature-corrupted driver, the installation unit installs the driver on which the customization has been performed without stopping the print spooler, and if the OS does not install a signature-corrupted driver, the installation unit stops the print spooler and modifies the installed driver while the print spooler is stopped.

8. The information processing apparatus according to claim 1, wherein the customization includes a modification of an initial value of the function setting value displayed by default in the function setting screen and a modification of a display of the function setting value that can be set.

9. The information processing apparatus according to claim 1, wherein the OS included in the information processing apparatus is Windows (registered trademark) that does not install a signature-corrupted driver.

10. The information processing apparatus according to claim 1, wherein the driver is a printer driver, and the function setting value is a print setting value.

11. The information processing apparatus according to claim 1, wherein the installation unit stops installation processing after installing the driver on which the customization has not yet been performed and, upon receiving an instruction from a user, modifies the installed driver such that a function setting value that can be set through the installed driver, becomes identical to the function setting value of the driver on which the customization has been performed.

12. A method for installing a driver on an information processing apparatus, the method comprising:
starting installation of a driver customized as to a function setting value that can be set in a function setting screen is made;
creating a customized driver including a catalog file in which a hash value is written corresponding to the driver on which the customization has not yet been performed, and
comparing a hash value of a setting file of the driver on which the customization has not yet been performed included in the customized driver with the hash value in the catalog file, and if the has values match with each other,
installing a the driver on which the customization has not yet been performed and
replacing a setting file of the installed driver with the setting file of the driver on which the customization has been performed included in the customized driver, in response to the start of installation of the driver;
wherein the function setting value that can be set through the driver is determined based on a setting file of the driver, and wherein the installation unit modifies the driver by replacing a setting file of the installed driver with a setting file created through the customization.

13. A program that causes a computer to execute:
accepting an instruction specifying an installation set format driver;
displaying a customization screen for performing customization on the driver as to a function setting value settable through a function setting screen displayed by the driver;
creating a customized driver including a catalog file in which a has value is written corresponding to the driver on which the customization has not yet been performed:
comparing a hash value of a setting file of the driver on which the customization has not yet been performed included in the customized driver with the hash value in the catalog file, and if the hash values match with each other, installing the driver on which the customization has not yet been performed and replacing a setting file of the installed driver with the setting file of the driver on which the customization has been performed included in the customized driver,
wherein the function setting value that can be set through the driver is determined based on a setting file of the driver, and wherein the installation unit modifies the driver by replacing a setting file of the installed driver with a setting file created through the customization.

* * * * *